US010963435B1

(12) United States Patent
McAlister et al.

(10) Patent No.: US 10,963,435 B1
(45) Date of Patent: Mar. 30, 2021

(54) DATA VALIDATION OF DATA MIGRATED FROM A SOURCE DATABASE TO A TARGET DATABASE

(71) Applicant: Amazon Technologies, Inc., Seattle, WA (US)

(72) Inventors: Grant Alexander Macdonald McAlister, Seattle, WA (US); Edward Paul Murray, Sammamish, WA (US); Nicolas Anton Medhurst Hertl, Edmonds, WA (US); Ilia Gilderman, Bellevue, WA (US); Jeremiah C. Wilton, Seattle, WA (US); John MacDonald Winford, Vancouver (CA); Satheesh Peringandookaran Subramanian, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 167 days.

(21) Appl. No.: 15/653,871

(22) Filed: Jul. 19, 2017

Related U.S. Application Data

(60) Provisional application No. 62/530,707, filed on Jul. 10, 2017.

(51) Int. Cl.
*G06F 16/21* (2019.01)
*G06F 11/07* (2006.01)
*G06F 11/16* (2006.01)
*G06F 16/11* (2019.01)

(52) U.S. Cl.
CPC ........ *G06F 16/214* (2019.01); *G06F 11/0766* (2013.01); *G06F 11/167* (2013.01); *G06F 16/119* (2019.01)

(58) Field of Classification Search
CPC .. G06F 16/214; G06F 16/119; G06F 11/0766; G06F 11/167
See application file for complete search history.

(56) References Cited

U.S. PATENT DOCUMENTS

| 9,542,406 | B1 * | 1/2017 | Bourbonnais | ....... G06F 16/1805 |
| 9,600,513 | B2 * | 3/2017 | Bourbonnais | ....... G06F 16/2365 |
| 2014/0372374 | A1 * | 12/2014 | Bourbonnais | ......... G06F 16/273 |
|  |  |  |  | 707/613 |
| 2015/0331875 | A1 * | 11/2015 | Regidi | .................. G06F 16/122 |
|  |  |  |  | 707/694 |
| 2016/0275150 | A1 * | 9/2016 | Bournonnais | ....... G06F 16/2462 |

* cited by examiner

*Primary Examiner* — Irete F Ehichioya
*Assistant Examiner* — Xiaoqin Hu
(74) *Attorney, Agent, or Firm* — Lowenstein Sandler LLP

(57) ABSTRACT

A method and system for validating data migrated from a source database to a target database and storing validation metrics resulting from validating the data are described. The system receives validation information to be used to validate data to be migrated from a source database to a target database. The system validates the data using the validation information and stores validation metrics resulting from validating the data.

23 Claims, 12 Drawing Sheets

| Schema | Table | State | Total | Compared | In Sync | Out Of Sync | Cannot Compare | Pending Compare | Last updated |
|---|---|---|---|---|---|---|---|---|---|
| DMS_SAMPLE | MLB_DATA | Table completed | 1000 | 900 | 898 | 2 | 20 | 80 | 1/4/17, 6:09 AM |
| DMS_SAMPLE | NAME_DATA | Table completed | 5,373 | 0 | 0 | 0 | 0 | 5,373 | 1/4/17, 6:09 AM |
| DMS_SAMPLE | NFL_DATA | Table completed | 8809 | 8809 | 8809 | 0 | 0 | 0 | 1/4/17, 6:09 AM |
| DMS_SAMPLE | NFL_STADIUM_DATA | Table completed | 7643 | 7643 | 7637 | 6 | 0 | 0 | 1/4/17, 6:59 AM |

FIG. 10A

| TaskIdentifier | SchemaName | TableName | RuleName | StartKey | EndKey | RecordType | RecordCount | FailureType |
|---|---|---|---|---|---|---|---|---|
| TZBSZGEWG4DIDPX6Z6PO2B4OVA | Company | Employee | ValidationRuleId1 | {emplId:12345} | | Row | 1 | OutOfSync |
| TZBSZGEWG4DIDPX6Z6PO2B4OVA | Company | Employee | ValidationRuleId1 | {emplId:12732} | | Row | 1 | OutOfSync |
| TZBSZGEWG4DIDPX6Z6PO2B4OVA | Company | Customer | ValidationRuleId6 | {custId:4500} | {custId:5000} | Range | 500 | OutOfSync |
| TZBSZGEWG4DIDPX6Z6PO2B4OVA | Company | Customer | ValidationRuleId6 | {custId:7000} | {custId:7400} | Range | 400 | OutOfSync |
| TZBSZGEWG4DIDPX6Z6PO2B4OVA | Company | Customer | ValidationRuleId6 | {custId:1} | | Key | 1 | CannotCompare |
| TZBSZGEWG4DIDPX6Z6PO2B4OVA | Company | Product | ValidationRuleId4 | {productType:Product1, productId:45} | | Key | 1 | OutOfSync |
| TZBSZGEWG4DIDPX6Z6PO2B4OVA | Company | Product | ValidationRuleId4 | {productType:Product5, productId:50} | {productType:Products, productId:50} | Range | 50 | OutOfSync |

DATA VALIDATION OF DATA MIGRATED FROM A SOURCE DATABASE TO A TARGET DATABASE

RELATED APPLICATIONS

This application claims the benefit of U.S. Provisional Application No. 62/530,707, filed Jul. 10, 2017, the entire contents of which are incorporated by reference.

BACKGROUND

Database migration services can be used for migrating data from a source database to a target database. For example, the database migration service can connect to the source database, read the source data, format the source data for consumption by the target database, and load the target data into the target database. The source database and the target database may be homogeneous or heterogeneous databases. Conventional data migration services do not include mechanisms to validate the data being migrated. Rather, after migration of the data from the source database to the target database, a customer manually spot checks the data in target database against the data in the source database to ensure their data is migrated accurately.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

FIG. 10A illustrates a view of a console for viewing validation results according to one embodiment.

FIG. 10B illustrates a validation failure table according to one embodiment.

DETAILED DESCRIPTION

Figure 1:
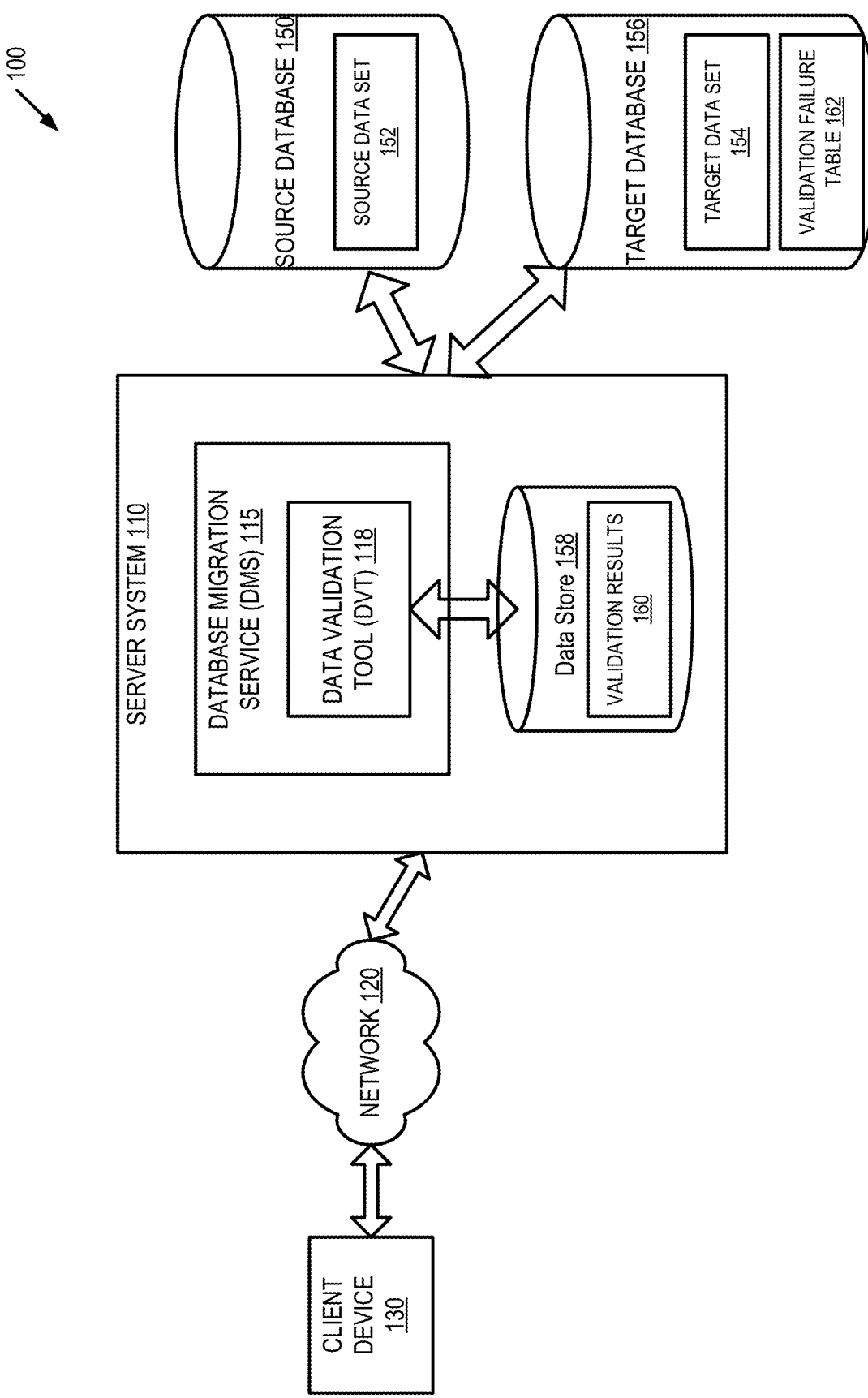
FIG. 1 is a block diagram of an example network architecture in which embodiments of a data validation tool may operate.

Embodiments described herein relate to validating data migrated from a source database to a target database and storing validation metrics resulting from validating the data. In one embodiment, a data validation tool can receive validation information to be used to validate data to be migrated from a source database to a target database. The data validation tool validates the data using the validation information and stores validation metrics resulting from validating the data.

As described above, a data migration service can be used for migrating data from a source database to a target database, but conventional data migration services do not include the ability to validate the data being migrated. The embodiments described herein set forth a data validation process in which the migrated data can be compared during the migration of the entire database since the entire database may be very large, like 1 billion records, or quickly changing datasets. Instead of merely spot checking some of the migrated data after completion of the migration, the embodiments described herein can permit data validation of a large database that is subject to change as the source database may still be online. The data validation process is configured such that different levels of data validation may be used to validate the data. For example, a customer could specify validation information to indicate that the data validation process should do a simple comparison of a number of rows in the source and target databases as a first level of data validation. Alternatively, the customer could specify validation information, including more sophisticated validation rules, like applying a function to the source and target database to give a higher level of confidence of successful data migration without doing a comparison of all rows. The solution can allow customers to specify the validation information to configure the specific validation rules commensurate with the desired validation level.

Also, the large size of some databases makes data validation after the entire database is migrated difficult. The embodiments of the data validation process described herein has the ability to partition the database into partitions (e.g., groups of contiguous rows) to make meaningful comparisons. For example, by getting the partitions to a smaller level of granularity, the smaller partitions can be validated as successfully migrated (with no changes and with the desired level of validation such as a row-by-row comparison, a row count, a function applied to the partition, etc.) and the rows that are still changing can be identified for a customer. The rows that are still changing can be validated later or marked as not comparable for the customer.

When a data set (e.g., a table) is large, the data validation process may compare the entire data set by splitting the data set into multiple partitions or smaller manageable units of data, such as a group of contiguous rows. The smaller manageable unit may be partitioned based on the primary keys of the database. The data validation process can compare either the data of the partitions in the source and target databases or results of a function applied to the partitions in the source and target databases. The data validation process can check whether there are changes occurring to this partition to mark as not comparable or to be compared at a later point in time. The data validation process can compare the partition in the source and target databases to validate when there are no changes occurring within a partition as a smaller manageable unit while other units may still be changing. To determine when to split and how much to split the database for validation, the data validation process can receive validation information that configures partition size, the number of partitions, as well as other conditions on partitioning. For example, to save on a number of splits, the partition size and the number of partitions that can be compared at any point in time are configurable.

The data validation process can generate and store validation statuses of the partitions as well as validation metrics of the partitions being validated. The validation metrics can be exposed to the customer during the migration to help customers understand the data discrepancies, and potentially modify the validation information to select different validation rules/levels, to have a higher degree of confidence in the data migration.

Also described herein are embodiments of a data validation tool to provide the ability to validate the migrated data, the data being migrated, or both. The data validation tool may be integrated into a data migration service or may be a standalone software product or feature that is used in connection with migration being performed by a data migration service. The data validation tool may validate migrated data between homogenous databases or migrated data between heterogeneous databases. Instead of a manual spot check to verify all records are migrated after the migration has completed (e.g., executing count(*) queries on both source and target databases), the data validation tool provides support to a data migration service for built-in validation during migration and/or after migration. The data validation tool can validate data in large databases and while the data in these databases are subject to change because of continued used of the source database. The data validation tool can provide validation metrics to a customer of the data migration service to provide a validation status of the data during the migration, as well as after completion of the migration. For example, when the data validation tool determines that the data is not successfully migrated, the data validation tool can provide details on the data discrepancies to help customers easily identify and remedy a problem with the migration. The data validation tool can provide a higher level of confidence to the customer that the data has been migrated accurately, as compared to manually spot checking the migrated data.

FIG. 1 is a block diagram of an example network architecture 100 in which embodiments of a data validation tool (DVT) 118 may operate. The network architecture 100 may include server system 110 and a client device 130 capable of communicating with server system 110 via a network 120. Network 120 may include, but is not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network 120 may have any suitable communication range associated therewith and may include, for example, public networks (e.g., the Internet), metropolitan area networks (MANs), wide area networks (WANs), local area networks (LANs), or personal area networks (PANs). In addition, the network 120 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

Client device 130 may include any type of mobile computing device (e.g., that has a finite power source) or traditionally non-portable computing device. Client device 130 may be a mobile computing device such as a tablet computer, cellular telephone, personal digital assistant (PDA), portable media player, netbook, laptop computer, portable gaming console, motor vehicle (e.g., automobiles), wearable device (e.g., smart watch), and so on. Client device 130 may also be a traditionally non-portable computing device such as a desktop computer, a server computer, or the like. Client device 130 may be configured with functionality to enable execution of an application to interact with a database migration service 115, data validation tool (DVT) 118, or both.

Communication between the server system 110 and the client device 130 may be enabled via any communication infrastructure, such as public and private networks. One example of such an infrastructure includes a combination of a wide area network (WAN) and wireless infrastructure, which allows a user to use client device 130 to interact with database migration service 115, data validation tool 118, or both without being tethered to the server system 110 via hardwired links. The wireless infrastructure may be provided by one or multiple wireless communications systems. One of the wireless communication systems may be a Wi-Fi access point connected with the network 120. Another of the wireless communication systems may be a wireless carrier system that can be implemented using various data processing equipment, communication towers, etc. Alternatively, or in addition, the wireless carrier system may rely on satellite technology to exchange information with the client device 130.

Server system 110 may be set up by an entity such as a company or a public sector organization to provide one or more services (such as various types of cloud-based computing or storage) accessible via the Internet and/or other networks to client device 130. Server system 110 may include numerous data centers hosting various resource pools, such as collections of physical and/or virtualized computer servers, storage devices, networking equipment and the like, needed to implement and distribute the infrastructure and services offered by the server system 110, including to provide multi- and single-tenant services. In some embodiments, server system 110 may implement the database migration service 115, data validation tool 118, or both, and associated services, provide other computing resources or services, such as a virtual compute service and storage services, such as object storage services, block-based storage services, data warehouse storage service, archive storage service, source database 150, target database 156, and/or any other type of network based services (which may include various other types of storage, processing, analysis, communication, event handling, visualization, and security services, such as a code execution service that executes code without client management of the execution resources and environment). Client device 130 may access these various services offered by server system 110 via network 120, for example through an application programming interface (API) or a command line interface (CLI). Likewise network-based services may themselves communicate and/or make use of one another to provide different services.

Server system 110 may include the database migration service (DMS) 115 that has access to source database 150 that stores source data set 152 and target database 156. The DMS 115 connects to the source database 150, reads the source data set 152 and formats the source data set as target data set 154 to be stored in the target database 156. The source database 150 and target database 156 may be implemented in one more data repositories, including or more storage devices. The source database 150 and the target database 156 can be homogeneous databases or heterogeneous databases. The source database 150 and the target database 156 can be large relational databases that include multiple tables. The DMS 115 can format (or reformat) the data from the source data set 152 for consumption by the target database before loading the data in the target database 156 as the target data set 154. In some cases, the DMS 115 may reformat the data from a schema used by the source database to a different schema used by the target database.

Server system 110 may also include the data validation tool (DVT) 118 that validates data being migrated from the source database 150 to the target database 156. In one embodiment, the DVT 118 may be integrated as part of the DMS 115. In another embodiment, the DVT 118 is a separate product or feature from the DMS 115. The DVT 118 can validate migrated data while the data in these databases is subject to change because of continued used of the source database 150. The DVT 118 can determine validation metrics and store the validation metrics as validation results 160 in a local data store 158. The DVT 118 can provide the validation results 160 to a customer of the DMS 115. The validation results 160 can include metrics such as a count of total number of migrated rows, how many rows were compared, how many rows are in sync, how many rows are out of sync, how many rows are not comparable as there are inflight changes to these rows, or the like. The validation results 160 may include a validation status of the target data set 154, validation statuses for partitions of the target data set 154, as described herein, as well as additional validation details. For example, when the DVT 118 determines that the data is not successfully migrated, the DVT 118 provides details on the data discrepancies to help customers easily identify and remedy the problem with the migration. In one embodiment, the DVT 118 determines there are records that do not match (e.g., OutOfSync records), the DVT 118 can insert the corresponding primary keys of these corresponding records into a validation failure table 162 in the target database 156. A rule identifier can also be stored in the validation failure table 162 along with the primary keys. If DVT 118 performs a group-level comparison for matching, then a range of the primary keys may be inserted into the validation failure table 162 in the target database 156. The validation results 160 and the validation failure table 162 can help customers gain a high level of confidence in the data migration and figure out how much of their data has successfully been migrated and validated. The validation results 160 and the validation failure table 162, generated and stored by the DVT 118, can provide a higher level of confidence to the customer that the data has been migrated accurately, as compared to manually spot checking the migrated data as described above. Also, the validation results 160 and the validation failure table 162 can help customers figure out how much of the data has been successfully been migrated and validated.

It should be noted that different customers may use DMS 115 to migrate different kinds of data and may not need the same kind of data validation. For example, some customers can afford cheaper, less accurate validations, such as counting the number of rows, while some customers need to compare every byte from each and every row. In one embodiment, the DVT 118 is configurable to allow a customer to select a level of data validation, by selecting a validation rule from a variety of available validation rules that is commensurate with the selected level of data validation. The validation rules can use different validation techniques and a customer can select a validation rule that is appropriate for their situation to be applied by the DVT 118.

The following examples set forth some scenarios where customers of the DMS 115 would select different levels of data validation. For example, a customer may use the DMS 115 to migrate their production database. Before doing a cut over to start using a new production database, the customer wants to get high confidence in their migration by comparing the data between the existing production database and the new production database. With the DVT 118, the customer can configure the data validation when they create the task of migration and look at the validation metrics, determined by the DVT 118 during the migration, to determine if records have been migrated correctly. In another example, a customer of DMS 115 is performing a migration of a database which is a few terabytes in size. As soon as they start their migration, the customer wants to know if the data is being migrated without any kind of loss or corruption. It can be important for them to know issues as early as possible to avoid wasting time. Using the validation results from the DVT 118, the customer may quickly find issues with the migration (such as data truncation, data transforms, etc.), fix the migration task, and re-run it. In another example, a customer of DMS 115 is using continuous replication to replicate data into different databases (e.g., for analytics). Since it is their production system, the customer wants to ensure the data is getting migrated without any loss or corruption. A different customer of DMS 115 is doing a migration of a very large database. This customer may want to ensure their recent data is migrated correctly, but really does not care if some corruption exists within some of the older data. In another example, a customer of DMS 115 is doing a migration of a really large database. The customer may only want to check a certain percentage of the rows to gain a high level of confidence in the migration.

At a high level, the DVT 118, as described herein, 1) provides a mechanism to compare data (data validation) between two databases which are continuously changing; 2) provides a configurable and extensible platform for the data validation; and 3) reports validation metrics and details of the validation results to easily understand the data discrepancies. The DVT 118 is not concerned with trying to figure out if the source and target databases are, or were, in sync at any given point in time.

To perform data validation, the DVT 118 validates whether data has been successfully migrated from a source database 150 to a target database 156 without error. To validate the migrated data, DVT 118 compares the source data set 152 in the source database 150 and the target data set 154 in the target database 156 to ensure they are the same. To compare the data, DVT 118 makes appropriate queries to the source database 150 and the target database 156 to retrieve the data. The DVT 118 then compares the data and stores the results of the comparison. The results can be exposed to the customer, for example, via an application programming interface (API). The customer can use the results of the comparison to determine whether a significant difference exists between the source data set 152 and target data set 154. In a further embodiment, the DVT 118 allows a customer to configure data validation by allowing the customer to specify validation rules.

While the above validation process performed by the DVT 118 may seem simple, the following properties/constraints can make it challenging: 1) Data can be very large; 2) Data can be changing; 3) Resource Utilization.

For 1), databases can contain an enormous amount of data and any reasonable validation solution must be able to scale to support very large databases. For 2), data in databases is rarely static, some databases absorb a significant number of changes: new data may be inserted and existing data may be modified or deleted. A good validation solution should take this into consideration. For 3), database and network resources may be limited. A viable validation solution should seek to minimize resource consumption as much as possible. The DVT 118 can perform validation while taking into account these three properties/constraints.

To deal with large amounts of data for 1), the DVT 118 splits the data (152, 154) into smaller manageable units and compares the smaller manageable units. The DVT 118 can operate on a table level and compare the data at a table level. However, for tables that may be very large, the DVT 118 partitions the tables into one or more partitions (also referred to herein as "groups of rows") and compares the partitions. The DVT 118 partitions both the source data and the target data for the comparisons. In one embodiment, the DVT 118 splits the table into multiple partitions based on the primary key, where the each of the partitions is a smaller group of contiguous rows. The DVT 118 then compares each partition of rows from the source database 150 and target database 156. The size of the partition and the number of partitions for a table are configurable. The DVT 118 may have a default partition size and number of partitions, but these default values may be changed by a customer. Also, the number of partitions which can be compared at any point in time may also be configurable. The partitioning approach may help the DVT 118 compare a predefined amount of data at any point in time.

To deal with the changing nature of the source database 150 in 2), different approaches may be used. Data in the source database 150, as well as the target database 156, could be modified continuously while the DVT 118 is comparing data for data validation. In some cases, the DMS 115 tracks and has control over the changing data in the source database 150 and only the DMS 115 can change data on the target database 156. In one embodiment, the DVT 118 uses a consistent reads approach to deal with comparing continuously changing data. With this approach, DVT 118 makes a read repeatable query to the source database 150 to read the data as of a point in time ('t'). Then, the DVT 118 waits for DMS 115 to apply all the changes which occurred on the source as of time 't' to the target database 156. The DVT 118 then makes a read repeatable query to the target database 156 to compare the data from the source and target databases.

In another embodiment, the DVT 118 uses an inconsistent reads approach to deal with comparing continuously changing data. With this approach, DVT 118 makes a query to the source database 150 and a query to the target database 156 at approximately the same time. If no transactions have occurred on the source database 150 for the rows in our data set during the execution of the query on the source database 150, meaning the data which the DVT 118 intends to compare is not changing on the source, the DVT 118 compares the results of the queries; otherwise, DVT 118 abandons the comparison and may try again later.

It should be noted that consistent reads are not supported by some of the source database engines. Even in cases where database engines support consistent reads, a change data capture (cdc) event may not have enough information to correlate the point of time of the query with cdc event. Without finding the point of time information from cdc event and correlating it with point of time obtained from the read repeatable query, the DVT 118 may not accurately find out if all changes have been applied to the target database 156 before making the corresponding query to the target database 156. However, there are some database engines that do support consistent reads and may have enough information for the DVT 118 to correlate the point of time of the query with the cdc event. For example, a database engine that supports retrieving system change number (scn) in read repeatable query and a cdc log stream contains scn, the DVT 118 can determine that all updates have been applied until a point in time to the target database 156. In some database engines, the read repeatable query is supported and the cdc log stream has a log sequence number (LSN), but the current LSN cannot be obtained in the repeatable read query itself. In such cases, the cdc log stream contains a timestamp at a second level granularity that can be used to find out if updated have been applied until time "t". However, there are some database engines where the timestamp is not available in the cdc stream. In other database engines, the read repeatable query is not supported unless a snapshot isolation feature is turned on. The snapshot isolation can be turned on at a database level (not at a session level). In other database engines, the repeatable reads require locks which prevent updates while the read query is in progress.

It should also be noted that some target databases do not support repeatable reads, and in those cases, the DVT 118 would pause the cdc operation before querying the target database. This may further slowdown the cdc operation, which may also be slow because a single thread is used to apply cdc changes to the target database. Consistent queries may be used by the DVT 118 to determine whether the data at time 't' was in sync or not. Inconsistent queries may be used by the DVT 118 to determine the same when data is not changing in the partition. In the case where data in the partition gets modified, then the previous result is already stale and the DVT 118 will re validate the partition anyway. Even using inconsistent reads, the DVT 118 can accurately figure out one of the following: (1) data matches, (2) data does not match, or (3) data does not match yet, but there is an inflight transaction. An inflight transaction indicates that the data is changing, so it cannot be currently validated. Given the inconsistency of the database engines described above, inconsistent comparison may provide a generic solution which works across all database engines in the same way.

To handle any shortcomings when using inconsistent queries, the DVT 118 can determine when there are too many dirty partitions because of many random updates spanning the entire table. A dirty partition is a partition in which data is changed or changing. In one embodiment, the DVT 118 can split a partition into multiple sub-partitions (also referred to as "smaller partitions") to be able to compare some of the partition as some of the sub-partitions may not be dirty (i.e., have changed or changing data). The leftover dirty sub-partitions can be tracked and compared at a later point in time. This approach allows the DVT 118 to compare most of the rows. In some cases where the table is busy with random updates across the entire table, the dynamic partitioning described above may result in increasing the number of queries to the source and target databases for comparing the data. In practice, few customer tables would have true random updates scattered all across tables. If the customer table is small, then DVT 118 can easily compare it with row-level comparisons. In the case where the customer table is big and there are random frequent updates across the database, the customer is likely already running the database on a machine with higher capabilities that could handle the extra additional queries made by the DVT 118. In a worst case where the customer database cannot handle extra queries, then customer can configure the DVT 118 to not permit further splitting of the partitions into the sub-partitions and prevent row-level comparisons to prevent additional queries. Although this may be a rare scenario, the customer can stop or slow down updates to the source so the DVT 118 could catch up before the database migration cut-over.

In some cases where data validation is being used in connection with migration, there could be a phase where a customer would slow down or stop updates to the source database to make all updates from the source database propagate to the target database. The validation by the DVT 118 could be completed during this phase. In some cases where data validation is being used in connection with replication, the customer may scale the database in the event that the database can't handle the additional queries made during row-level validation by the DVT 118.

As described above, reading the data from a source and a target and comparing them are resource intensive tasks since this process can consume database resources, as well as network resources. In order to minimize the usage of resources, three different approaches may be used including a) a Bulk Fetching Rows approach; b) a Grouping Queries approach; and c) a hybrid approach.

For the Bulk Fetching Rows approach in a), the DVT 118 can use a query to fetch a number of rows together in a single query to take advantage of batch queries, instead of making queries to fetch specified columns from the tables from each and every individual row. While fetching the data, if configured, the DVT 118 may also apply one or more functions to reduce an amount of data transferred. For instance, if there is a column with a 5 MB size, the DVT 118 could fetch the checksum of the column to reduce the amount of data transferred.

For the Grouping Queries approach in b), the DVT 118 instructs the database to apply a function on a number of rows and retrieve a final value alone, instead of fetching individual rows. This may be used to reduce the amount of data transferred for data comparison and to reduce the amount of time for the data comparison. For instance, instead of retrieving all the rows to compare a column, the DVT 118 could retrieve count, average, sum, or the like, and compare them. Since the DVT 118 does not retrieve every row, this would improve performance. It should be noted that if any row in the group of rows changes during the time of comparison, the DVT 118 would have to re-compare. In some cases, this may result in too many re-comparisons to validate a group of rows.

For the hybrid approach in c), the DVT 118 uses a combination of the above approaches. Instead of grouping a constant number of rows together, the DVT 118 groups a dynamic number of rows. This enables the DVT 118 to group a high number of rows to start with and split them to smaller sizes (e.g., all the way up to 1) if there are changing rows within the range which the DVT 118 is comparing. It should be noted that customers can configure the comparison functions of the DVT 118 while configuring the validation rules and some of the comparison functions will work only when range count is 1 (i.e., row-based validation functions). This hybrid approach allows the DVT 118 to validate partitions even when there are modifications to the rows in one or more of the partitions. This hybrid approach may provide the benefits of each of the other approaches above, as well as provide more flexibility with the comparison functions being configurable, like the validation rules. The DVT 118 is described in further detail below with respect to FIG. 2.

In some implementations, the validation by the DVT 118 uses a primary key or unique index to perform data validation. In some cases, the data validation by the DVT 118 may generate additional query requests to databases and the databases use enough resources to handle the additional load. Also, it should be noted that if the target database gets modified by an entity other than the DMS 115, the validation by the DVT 118 may fail to report the discrepancies accurately. Also, if the same row or set of rows is getting modified continuously, then validation will not be able to validate those busy rows and a customer may have to check the busy rows themselves.

Figure 2:
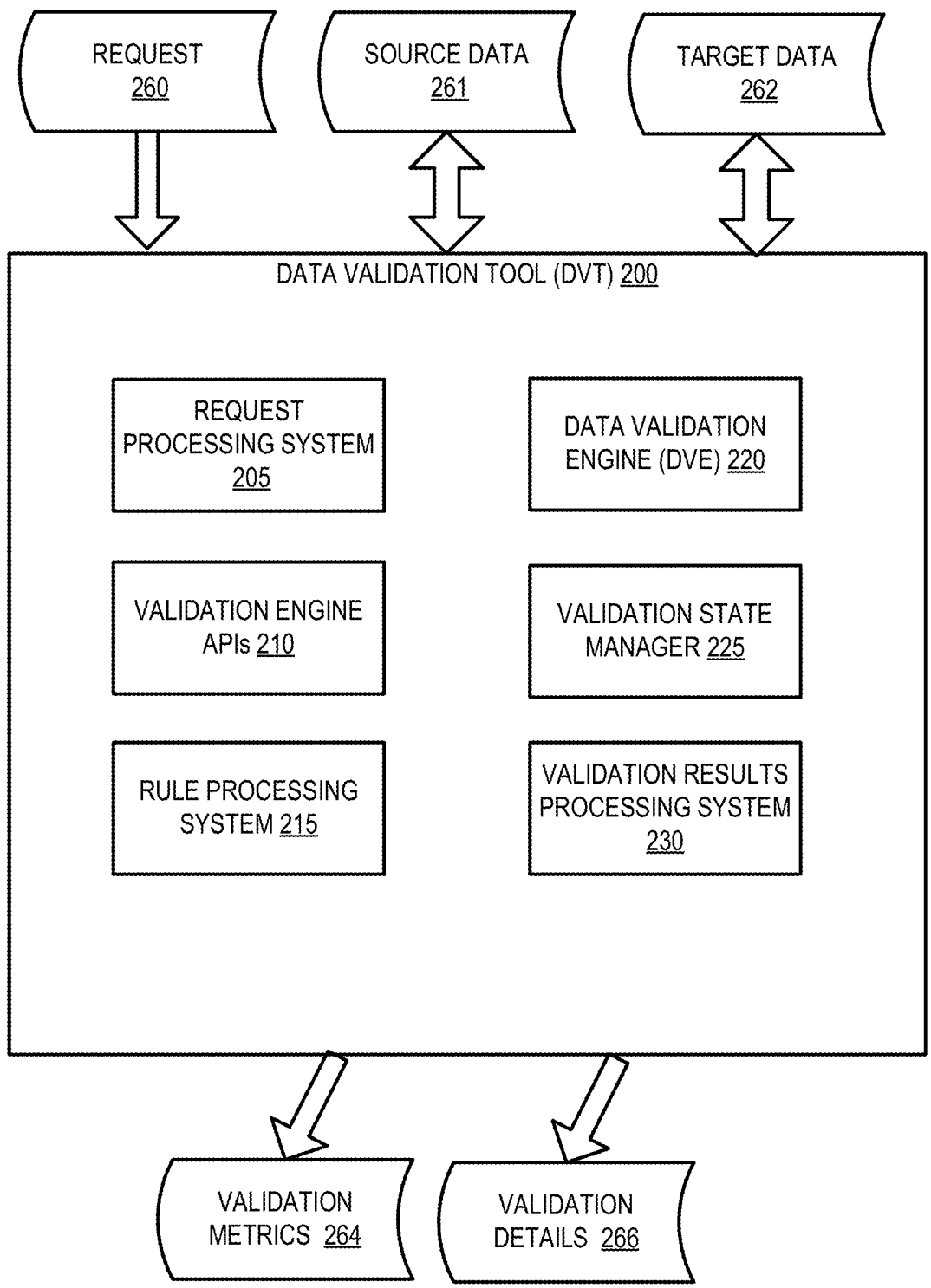
FIG. 2 is a block diagram of a logical view of a data validation tool (DVT), in accordance with one embodiment.

FIG. 2 is a block diagram of a logical view of a data validation tool (DVT) 200, in accordance with one embodiment. DVT 200 may correspond to the DVT 118 of FIG. 1. In some embodiments DVT 200 may include a data validation engine 220, a rule processing system 215, and a mechanism to expose the validation results. However, in the depicted embodiment, the DVT 200 may include a request processing system 205, validation engine APIs 210, the rule processing system 215, the data validation engine 220, a validation state manager 225, and a validation results processing system 230. In one embodiment, the validation engine APIs 210 and the validation results processing system 230 can be integrated into a single mechanism to expose the validation results to a customer. Collectively the components of the DVT 200 may provide a data validation mechanism that can be used in connection with database migration or database replication.

In one embodiment, request processing system 205 can receive a request (e.g., request 260) from a DMS (e.g., DMS 115 of FIG. 1), a replication service, or the like to validate data migrated or replicated from a source database and a target database. In particular, the request 260 can specify source data 261 stored at the source database and target data 262 stored at the target database. For example, in connection with creating a task to migrate the data from the source database to the target database in the DMS, the user can specify that the data is to be validated and can configure the level of data validation. As a result, the DMS creates the request 260 for the DVT 200 to allow the user to configure data validation commensurate with a desired level of data validation. The request 260 may include validation information that the DVT 200 uses to validate the data and that instructs the DVT 200 to store validation metrics resulting from validating the data. The validation information may include information that indicates a level of data validation to be used to validate the data. For example, the DVT 200 may provide multiple levels of data validation as multiple user-selectable options, and the request 260 includes a selection of one of the multiple user-selectable options made by the user. The DVT 200 may receive a selection of a validation rule from among multiple validation rules, each of the validation rules corresponding to a different level of validation of a migration of source data 261 and the target data 262. Alternatively, the DVT 200 may receive a selection of a level of validation from among multiple levels of validation of the migration and later apply a validation rule corresponding to the selection of the level of validation. For example, the validation rules may also be stored for the corresponding levels of data validation.

In another embodiment, in response to the request 260, the DVT 200 invokes the rule processing system 215 to permit a user to configure data validation, including adding, removing, or modifying validation rules, configuration functions, or the like, so that the DVT 200 validates the data according to the selected level of data validation. The rule processing system 215 can have predefined validation rules and configuration functions for different levels of data validation. The rule processing system 215 can also permit the user to import validation rules, configuration functions, or the like, to customize data validation for their particular task of migrating or replicating a database. In some cases, the customer provides a set of validation rules to configure how the DVT 200 is to perform the data validation. Based on the validation rules, validation will be performed by the data validation engine 220. The data validation engine 220 applies the validation rules to validate the source data 261 and target data 262 as described herein. The data validation engine 220 uses the validation state manager 225 to track the state of the data being validated. The validation engine APIs 210, validation state manager 225, and the validation results processing system 230 can be used to generate, store, and provide validation metrics 264 and validation details 266 to the customer. More specifically, the validation state manager 225 can be used to track the state of tables, rows, groups of rows (referred to herein as partitions). The validation results processing system 230 can generate validation metrics 264 based on the data validation performed by the data validation engine 220. The validation engine APIs 210 allow access to the customer to request the validation metrics 264 and the validation details 266 stored locally by the DVT 200. The validation metrics 264, as well as the validation details 266 (such as the out of sync records) can be exposed to the customer via the validation engine APIs 210 to help customers understand the issues found during data validation by the DVT 200.

In other embodiments, validation rules and validation configuration of the DVT 200 can be configured while creating a task, such as a migration task in a DMS or a task in the DVT 200 itself. For example, customers can use Create/Modify Task APIs of the validation engine APIs 210 to change the validation rules or the validation configuration managed by the data validation engine 220. Once a customer starts the task, the customer can view the validation results (validation metrics 264 and validation details 266) at a table level using DescribeTableStatistics API of the validation engine APIs 210. In some implementations, the customer can configure the validation rules and view the validation results in a console of the DMS when the DVT 200 is integrated within the DMS, for example.

In another embodiment, the rule processing system 215 allows a customer to specify table mappings and transformations as configuration rules while creating a task. The rule processing system 215 can be implemented in the DMS and can be expanded to let customers configure validation rules in the DMS as well.

The following description includes some examples of validation rules that can be configured in the rule processing system 215 and used by the data validation engine 220 for data validation:

1) The below rule will compare each and every row from source and target:

{
"rule-type": "validation",
"rule-id": "1",
"rule-name": "full compare",
"object-locator": {
  "schema-name": "%",
  "table-name": "%",
  "column-name": "%"
},
"rule-action": "compare",
"compare-function": "select(*)"
}

2) The below rule will select the primary keys from source as well as target and compare them:

{
"rule-type": "validation",
"rule-id": "1",
"rule-name": "check id",
"object-locator": {
  "schema-name": "%",
  "table-name": "%",
  "column-name": "%"
},
"rule-action": "compare",
"compare-function": "select( )"
}

3) The below validation rule specifies a row-level function and it would retrieve values of column id and check sum of column first name from source and target for comparison:

{
"rule-type": "validation",
"rule-id": "1",
"rule-name": "check id",
"object-locator": {
  "schema-name": "%",
  "table-name": "%",
  "column-name": "%"
},
"rule-action": "compare",
"compare-function": "select(id), cksum(first_name)"
}

4) The below validation rule specifies a group-level function to find the average of checksum of columns first_name and last_name:

{
"rule-type": "validation",
"rule-id": "1",
"rule-name": "check id",
"object-locator": {
  "schema-name": "%",
  "table-name": "%",
  "column-name": "%"
},
"rule-action": "compare",
"compare-function": "group. avg(cksum(first_name, last_name))"
}

Also, as described herein, the rule processing system 215 can define some simple default validation rules, like "compare PK only," "compare X percent only," "compare Table X, Y."

Figure 9A:
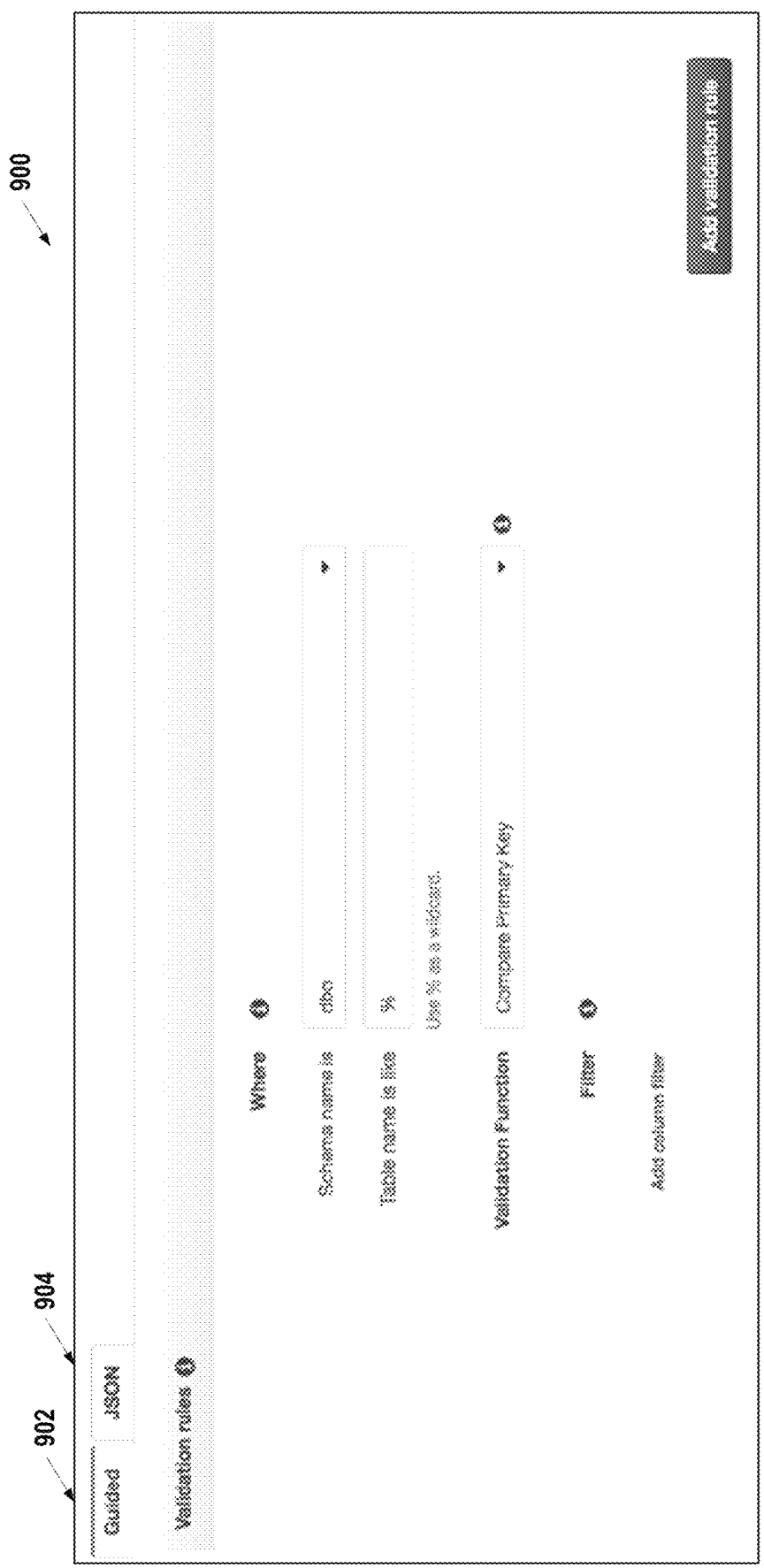
FIGS. 9A-9B illustrate views of a console for configuring validation rules according to one embodiment.
Figure 9B:
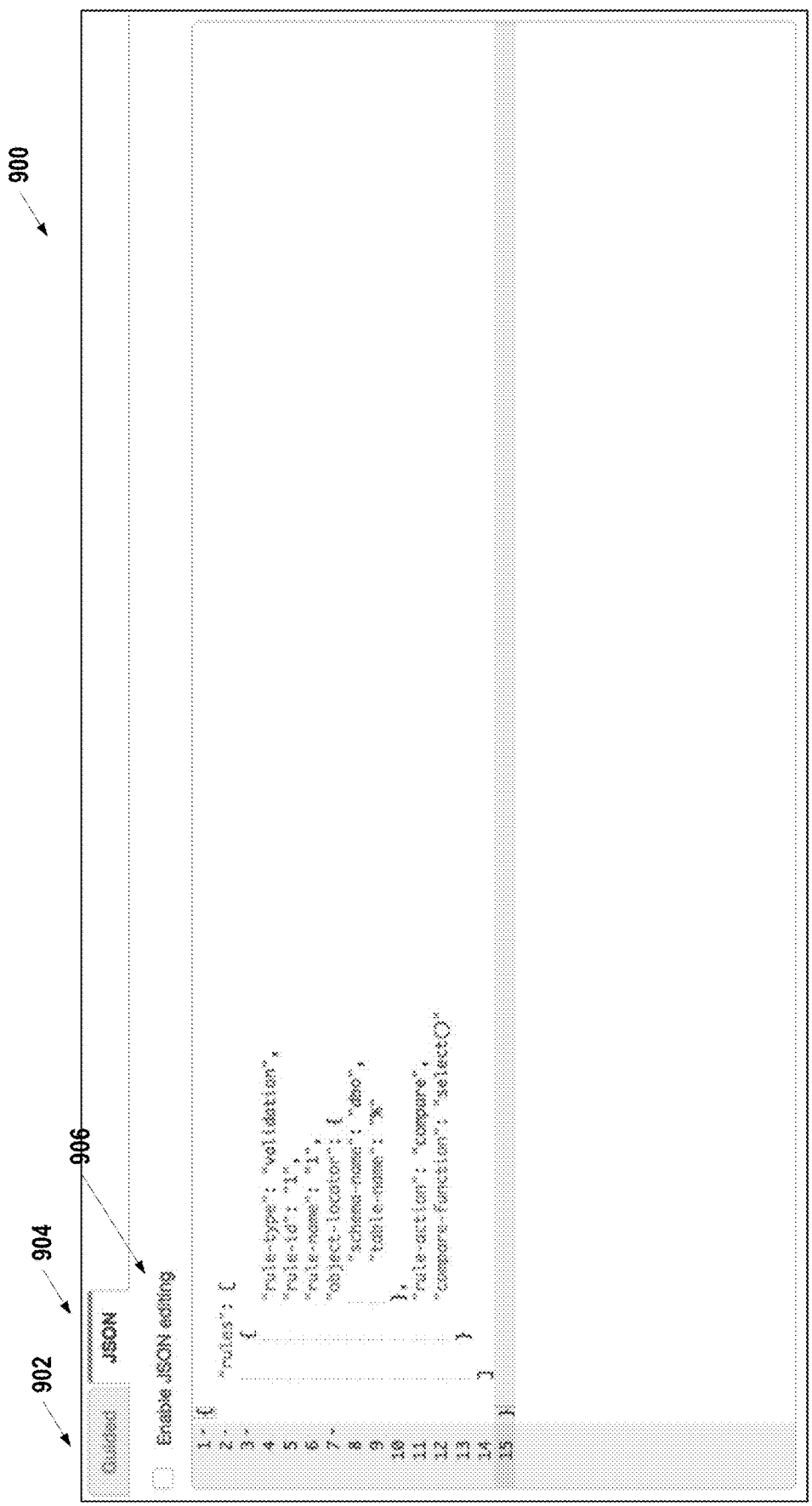

In one embodiment, the validation rules can be configured from a console 900 as illustrated in FIGS. 9A-9B. The console 900 may have a guided tab 902 in which fields are provided to define the scheme, the table name, and a menu to select predefined validation rules. The guided tab 902 may also include a menu to select a filter, as well as a mechanism to add a custom filter. The console 900 also has a JSON tab 904 in which the user may input custom validation rules in JSON language, such as those validation rules provided above. The JSON tab 904 can be used to configure different rules and advanced user can configure sophisticated validation rules. In other implementations, the application rules can be input using other formats that JSON. For example, SDK/CLI users would configure a validation rule when they create a task by providing the JSON formatted rule when the JSON tab 904 is active as illustrated in FIG. 9B. Existing table mapping rule attribute would be extended to support validation as a new rule type. The corresponding JSON rule to compare the primary keys would look like the JSON rule illustrated in FIG. 9B. The console 900 may also include a mechanism 906 that enables JSON editing of the validation rules when the JSON tab 904 is active.

In one embodiment, the validation results processing system 230 can record and report the following record counts as part of the table statistics for the validation metrics 264 as illustrated in Table 1 below.

TABLE 1

| Record Count Type | Description |
| --- | --- |
| Compared | Compared is the total number of records validator ever tried to compare, this will be equal to InSync + OutOfSync + CannotCompare |
| InSync | InSync is the records which are currently in sync between source and target. |
| OutOfSync | OutOfSync count indicates the number of unmatched records after applying all known updates to the target. A future update on the source might change a record from unmatched to matched |
| CannotCompare | CannotCompare count indicate the number of records which could not compare as those rows were too busy to compare and they will be compared at a later point in time |
| PendingCompare | PendingCompare is the number of records which are yet to be compared after the last modification. PendingCompare will contain CannotCompare records as well. |

In one implementation, one of the validation engine APIs 210 may include DescribeTableStatistics web service API that return validation metrics 264 at a table level (compared, InSync, CannotCompare, PendingCompare and OutOfSync records), such as those record counts illustrated in Table 1.

As described herein, a customer can configure multiple validation rules and if any of the rules does not match then the record will be marked as OutOfSync. If there is any OutOfSync records, then primary keys of corresponding records will be inserted into a validation failure table in the target database along with a rule identifier. If DVT 200 is not configured to find the rows, in case of a group validation function, then the range of the primary keys (group functions) may be inserted to the validation failure table in the target database.

OutOfSync records can happen due to an update failing to apply to the target due to constraint violations, type conversion issues, or the like. OutOfSync records can happen due to a direct update in the target. OutOfSync records can happen due to unknown reason or some bugs in the DMS. Once a customer finds one or more OutOfSync records, it's important to understand what caused it. By the DVT 200 identifying OutOfSync records, the customer can proactively investigate and fix the reasons for the OutOfSync records. Once fixed, the customer can reload the table which reports the OutOfSync records to confirm the fix.

In some cases, if there are any partitions which are too busy and validation is not configured to split the partition, then the partition range (first and last key in the partition) can be inserted into a validation failure table. If possible, customers can stop or reduce frequency of updates to the records in the primary key range in the source database. This would help to validate the partition as there would be a window of inactivity to execute the queries. Customers can also use their own mechanisms such as spot checking or custom queries for the range of records which are too busy to compare. If there are any partitions which are too busy and validation is configured to split the partition, then validation might split the partition until its size becomes configured minimum size. Even after splitting to single row partition and waiting for a configurable amount of time, if there are still inflight transactions for the busy rows, then busy rows can be inserted to validation failure table. If possible, customers can stop (or reduce frequency of) updates to the busy record in the source database. This would help to validate the record as there would be a window of inactivity to execute the queries. Customers can also use their own mechanisms such as spot checking or custom queries for records which are too busy to compare. Customers can configure how the task should behave when there is a validation failure. Two available options may be: 1) customers can configure to fail the task when there is "n" number of validation failures, where "n" is positive integer; 2) configure the task to never fail on validation failures.

The validation results processing system 230 can expose the validation results in various ways. In one implementation, the validation results processing system 230 can expose task level results with Compared, InSync, OutOfSync, CannotCompare and PendingCompare record counts in a describe tasks API. The validation results processing system 230 can expose table level results with Compared, InSync, OutOfSync, CannotCompare and PendingCompare record counts at the table level in a table stats API. The validation results processing system 230 can expose validation. The validation results processing system 230 can update the out of sync key ranges, keys, or the like, to target database in a table, such as the validation failure table noted above. The validation results processing system 230 can also update the task status to fail based on the validation result, if so configured. The validation results processing system 230 can provide the validation results in a console, such as illustrated in console 1000 of FIG. 10A. The console 1000 of FIG. 10A has a table statistics tab 1002 that includes a table with the validation results for multiple tables.

As described above, the validation results processing system 230 can provide validation details regarding failures identified during data validation by the DVT 200, such as a validation failure table 1050 illustrated in FIG. 10B. The validation failure table 1050 may be stored on the target database. As illustrated in FIG. 10B, the task has three keys which are not in sync, three ranges which are not in sync and 1 busy record which DVT 200 could not compare. If status of any of the record changes to InSync, then corresponding record will be removed from the validation failure table.

The structure of the validation failure table 1050 may be defined in the following Table 2 below.

TABLE 2

| Column | Description |
| --- | --- |
| TaskIdentifier | Identifier of the task |
| TableName | Name of the table |
| SchemaName | Name of the schema |
| RuleId | Identifier of the validation rule |
| StartKey | This is the primary key for row record type. |
| EndKey | It will be similar to start key except this will be present only for Range record type and this will be the end key of the range |

TABLE 2-continued

| Column | Description |
| --- | --- |
| RecordType | Can be either Row/Range |
| RecordCount | This represents the total number of records in the range. |
| FailureType | Either OutOfSync/CannotCompare |

If the StartKey is a range key, then it will be the start of the range. The StartKey can be represented as a JSON string where the key in the key-value pair will be the column name and the value of the key-value pair will be the corresponding value. The JSON string can contain all columns in case of a composite key. If any of the primary key is a binary object, then its value can be represented as a base64 encoded string in the JSON string. RecordCount represents the total number of records in the range, but does not mean all of them are OutOfSync or CannotCompare, it just means out of these records, some of them are out of sync/cannot compare. It should be noted for row records type, the value of RecordCount will always be 1.

Based on the outcome of the data validation engine 220 determining that a record/range of records is either OutOfSync/CannotCompare, the validation results processing system 230 can insert values into the validation failure table. When the customer finds any non-zero either OutOfSync/CannotCompare counts in the table statistics, the customer can query the validation failure table on the target database to find out exactly which records have OutOfSync/CannotCompare states.

During the validation process, the data validation engine 220 can convert the validation function, specified in the validation rules in the rule processing system 215, into corresponding queries that will be executed against both source and target database tables to compare the data. The validation function can be either row level or group level and they will result in either row-level or group-level queries, respectively. A row-level validation would apply a validation function to a row on the source and corresponding row on the target and compare the results. A group-level validation function would apply a validation function to a grouped set of rows on the source and the corresponding grouped set of rows on the target and compare the results. If source and target values do not match after applying a group-level validation function to a partition, that partition will be marked as dirty and the group function will be retried after a configurable interval of time. When a configurable number of subsequent attempts do not succeed, the partition will be split into multiple sub-partitions until the number of rows in the partition become a configured minimum partition size value (which can be as low as 1). If the partitions still do not match, then that partition will be reported as not in sync to the customer, provided there are no keys which belong to the partition which is getting modified.

For row-level comparison functions, the required data will be retrieved from both the source and target. Any rows that don't match will be saved for comparison at a later stage. Unmatched records for which there are no outstanding transactions will be re☐selected and compared for a configurable number of times after which they will be marked as "out of sync" and reported to the customer.

In one embodiment, the data validation engine 220 will query source and target only when there are no inflight transactions present for the partition or for the row. After the query, if there is a mismatch, then a check is done to see if there is a new incoming transaction of the partition/row. If the data validation engine 220 finds a new transaction, then the data validation engine 220 ignores the validation result and marks that partition for comparison at a later point in time or at a later stage.

The data validation engine 220 can perform group function comparisons, such as set forth in the example steps below:

```
def group_function_compare
check if there are any inflight transactions in progress for
    the partition by looking at the cdc event stream
if no inflight transaction for the partition then
    Make a group query to source and target tables
    check again to see if there are any inflight transactions
        in progress for the partition
    if still no inflight transaction for the partition then
        if query results does not match then
            retry after a configurable time
        else
            mark as success
        end if
        if query results does not match after retry then
            call split_compare(partition)
        else
            mark as success
        end if
    else
        if partition is busy with transactions for a prolonged
            period then
            call split_compare(partition)
        end if
    end if
else
    if partition is busy with transactions for a prolonged
        period then
        call split_compare(partition)
    end if
end if
end group_compare
def split_compare (partition)
split the partition into much smaller chunks (with a
    configurable number of rows in each chunk)
for each of the smaller partitions
    compare the smaller partition provided there are no
        inflight transactions
    if comparison does not match then
        for each row in the smaller partition
            call row_function_compare( )
        end for
    else
        mark as success
    end if
end for
end split_compare
```

The data validation engine 220 can perform row function comparisons, such as set forth as a special case of group comparison where the count is one, as set forth in the example steps below:

```
def row_function_compare
check if there are any inflight transactions in progress for
    the row by looking at the cdc stream
if there are no inflight transaction for the row then
    Make a query to source and target to retrieve the
        row-level data
    check again to see if there are any inflight transactions
        in progress for the row
    if still no inflight transaction for the row then
        compare the values retrieved from source and target
```

```
        if the value does not match then
            report the row as "OutOfSync" to customer
        end if
    else
        compare the row at a later time.
    end if
else
    compare the row at a later time.
end if
end row_compare
```

As described herein, some source databases can be large in size and the data validation engine 220 can partition a table of the source database into multiple partitions. The partition may be a group of rows or may be a group of data. The data validation engine 220 can operate on the partitions for efficiency reasons and when a row-level comparison is needed, the data validation engine 220 can fetch the partition of data and compare each individual row. Where a group validation function will be used by the data validation engine 220, the data validation engine 220 groups the partition data, applies the grouping function, and compares the result. The data validation engine 220 can fetch the required data, including the primary keys, for comparison in the lexicographic ordering of the primary keys. When fetching as many rows as the partition size limits. The data validation engine 220 can save the start key and the end key as the partition start key and the partition end key. The data validation engine 220 compares the data in the partition after reading data from source and target databases. The data validation engine 220 saves a status of the validation for recently created partitions in the validation state manager 225. Afterwards the data validation engine 220 can move on to create and compare the next partition until the entire table is covered. A total number of partitions may be dependent on a number of rows of a table or a number of rows of multiple tables. In one embodiment, when a partition has many new rows added after it was created, and the total number of rows increases beyond the 1.5 times more than the configured partition limit, the data validation engine 220 can split the partition into two. In order to split the partition, the data validation engine 220 can find the midpoint of the existing partition by making a query to find a primary key of $n/2^{th}$ record from the beginning of the partition. After that the data validation engine 220 would save the state of the new partitions. In rare scenarios, if a row-level comparison is not required or the task does not move all the records, then the data validation engine 220 initially partitions the table by making a query to find Nth record, where N is the partition size, and then save the state of the partition. After this the data validation engine 220 can move on to find the next partition by making a query to find next Nth record and so on. For example, a validation partition builder process can be used to define the partitions of a table being validated.

In one implementation that uses a data replication service, the data replication services may already know how to find the primary key or unique constraint by querying metadata tables for various engines and the DVT 200 could use similar processing logic to find the primary key for a table.

Figure 3:
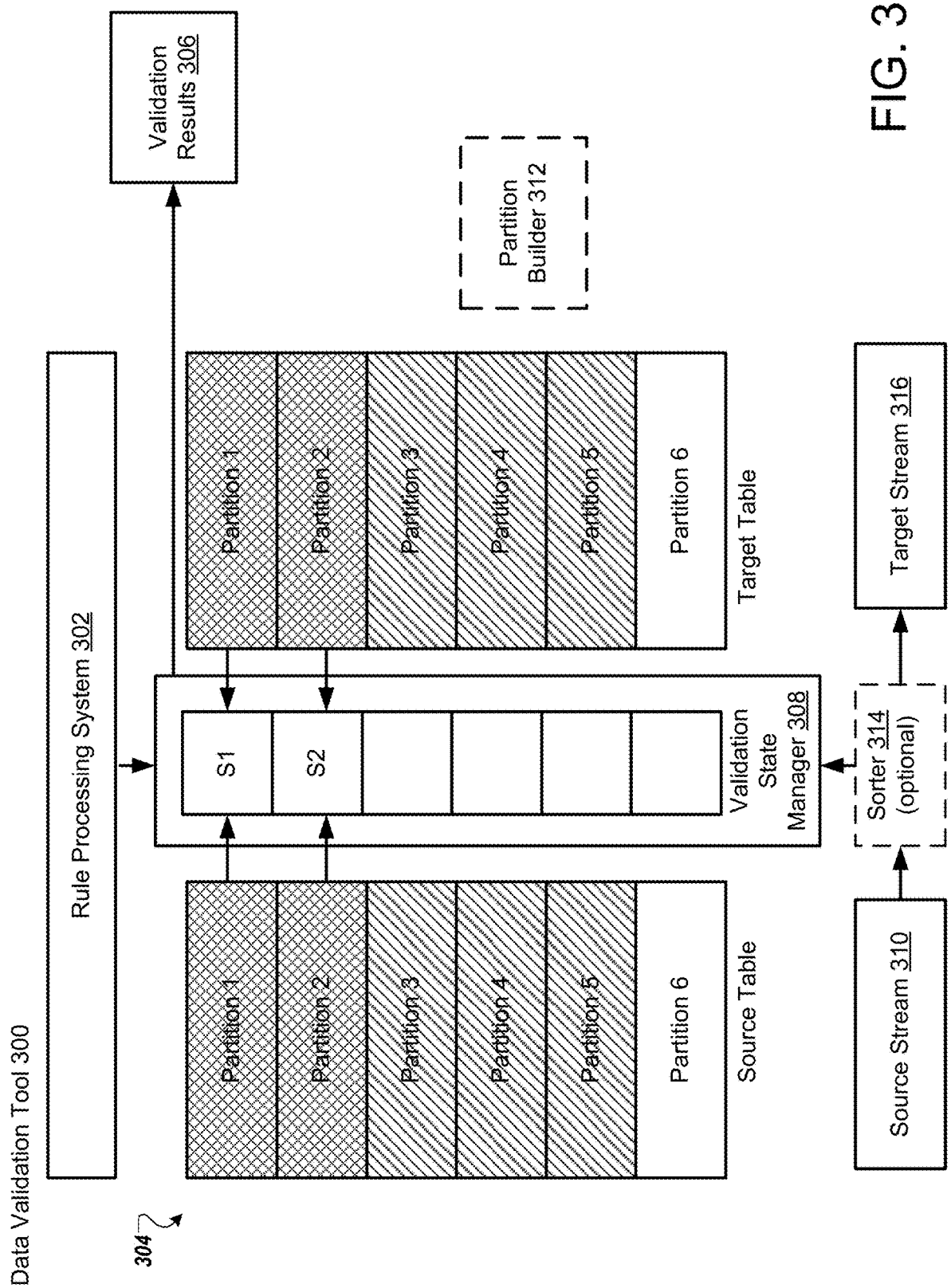
FIG. 3 is a block diagram of a logical view of a rule processing system, a data validation engine, and a validation results mechanism of a DVT according to one embodiment.

As described above, in some embodiments, DVT 200 may include a data validation engine, a rule processing system, and a mechanism to expose the validation results, such as illustrated in FIG. 3.

FIG. 3 is a block diagram of a logical view of a rule processing system 302, a data validation engine 304, and a validation results mechanism 306 of a DVT 300, in accordance with another embodiment. In order to handle different use cases, migration validation by the DVT 300 exposes a set of validation rules for customers to configure the data comparison based on their requirements. The DVT 300 performs data validation by comparing data from the source database with corresponding data in the target database. The DVT 300 keeps track of the unmatched records and may eventually declare them as non-matching, unless these records are found to be matching on a subsequent comparison as described herein. The DVT 300 can expose the validation results to customers so they can determine the status of the migration validation.

In the depicted embodiment, the validation engine 304 keeps track of a state of the validation for all tables in a task. The validation engine 304 can maintain the statue for all the tables, partitions, and sub-partitions using a validation state manager 308. The validation engine 304 can do the following: 1) The validation engine 304 exposes an API to add a key range for a table with the number of records in source. 2) The validation engine 304 exposes an API to mark a key as a dirty to indicate the data associated with key is modified in source (insert/delete/update operation). 3) The validation engine 304 is responsible for initiating and managing the validation based on configuration. 4) The validation engine 304 also exposes an API to retrieve the validation status of table(s).

In one embodiment, the validation engine 304 gets a list of processed rules from the rule processing system 302. Whenever a migration of an entire data set starts (e.g., referred to herein as a full load), the source unload will call the validation state manager 308 to add the key range and number of keys in the range. When the processed record count exceeds a configured threshold to initiate the validation, validation begins for the first batch of items. FIG. 3 depicts the state of validation when the validation is completed for the first two partitions and the migration is completed for five out of 6 partitions. After validation of each partition, the state of the validation may made to persist by the validation state manager 308. It should be noted that a full load is one type of task that may be performed and there may be other types of tasks, such as a task to migrate just the changed data as a partial load or a task that combines migration of the entire dataset and then migration of the changed data.

In one embodiment, the validation state for each partition may include the following information: 1) The partition's first key and last key; 2) The number of items in the source; 3) The number of items in target; 4) Result of the last validation attempt (InSync, OutOfSync, CannotCompare, NotCompared); 5) A dirty flag indicating at least one item in the source was modified after the partition was last validated; 6) A list of modified keys if the count is below the threshold; and 7) A flag indicating keys above the threshold were modified and the partition needs to be re-validated.

Validation by the validation engine 304 can continue until all the partitions in the table are covered. Once a table is moved to a cdc mode, the validation state manager 308 can capture the changing primary keys by getting the incoming cdc events in a source stream 310 from a source capture.

In one example, the states of the partitions 1, 3, 4, and 6 are validated and in sync, but partition 5 is marked dirty and needs to be re-evaluated. Partition 2 may have a few changed keys and needs to re-evaluate those keys only. During the cdc mode, the primary keys of changed rows will be captured from the source stream 310 for use by the validation process. Upon validation of a partition, if the number of changes for any given partition exceeds a configurable threshold, the entire partition will be marked to be re-evaluated, otherwise only those records which were modified will be re-evaluated. If a comparison fails, it will be retried a configurable number of times. If the comparison continues to fail on all subsequent attempts, and there are no outstanding transactions involving the rows being compared, the rows will be marked as mismatched. In one implementation, the time to wait after getting the cdc events is configurable as well as adaptive. For example, if there are a small number of updates, the comparison will be aggressive, if there are large number of updates, the comparison will be "backed off" to make use of batch query efficiencies. It should be noted that the validation process by the DVT 300 can be configured to be started during different phases of the migration, as described in the different scenarios below. For example, data validation can be configured to start during or after the full load. If configured to start during the full load, then migration validation may begin for a table after a configurable minimum number of records (minRecordCountToWait) have been migrated. Customers can configure minRecordCountToWait for comparison and, if at any point the number of non-compared keys goes above this value, validation will be performed for the next non-compared partition. In one embodiment, the number of elements in a partition being compared by the DVT 300 is controlled by the values of a max group size (MaxGroupSize) and a minimum group size (MinGroupSize). The validation engine 304 can group records within this size range (defined by the MaxGroupSize and MinGroupSize) and use them for comparison. In one embodiment, initially a partition size can be set to be MaxGroupSize and, if required, the partition can be split until the size becomes MinGroupSize. If configured to start after the full load, the validation engine 304 can compare the data only once and the comparison will be started only after the full load is finished for a table. The default value for a full load validation may be DuringFullLoad (e.g., FullLoadValidationBehavior: DuringFullLoad/AfterFullLoad).

For another example, data validation can be configured to start during a cdc mode. If configured to start during the cdc mode, customers can configure a maximum time (maxTimeTowait) and a minimum time (minTimeToWait) for a comparison. A comparison by the validation engine 304 is guaranteed to be started after minTimeToWait but before maxTimeTowait. The minTimeToWait is the minimum time to wait before starting the validation for a row. When there are a large number of updates happening (if the number of updates which are in flight is more than the threshold (InflightUpdateCountThreshold)) the wait time before comparing the data would be maxTimeTowait. During the cdc mode, the validation engine 304 can either "compare only the changed records" during the cdc mode (ChangesDuringCdc), or compare all the records (FullDuringCdc). On a relatively less busy system, individual comparison may be possible; however in a busy system it may be more efficient to compare ranges of data that include multiple changed rows. In one embodiment, the default value for cdc validation can be ChangesDuringCdc (e.g., CdcValidationBehaviour: ChangesDuringCdc/FullDuringCdc).

Validation state manager 308 maintains the state of validation for every partition within a table. The validation state may be kept in memory and flushed to disk on demand. For example, the validation state will be flushed to disk on following occasions: a) whenever a new table partition gets added or removed; b) whenever a first dirty record gets added to the partition; c) whenever a partition needs re-evaluation; d) whenever partition evaluation finishes and has a result; 3) whenever validation is being stopped. The validation engine 304 may iterate over validation states of dirty partitions on a configurable interval and perform row validation/partition validation based on the state of the validation. The validation engine 304 can perform row validation when the number of modified rows in the partition is within the row-level check limits. The validation engine 304 can perform partition validation when the number of modified rows in the partition is above the row-level check limits. During full load, whenever source unload gets new batch of records from the source, validation state for new partitions will be created if needed. During cdc, whenever the validation engine 304 gets a record during after insert/update/delete operation, the partition in which that record belongs would be marked as dirty. The validation engine 304 can also keep the primary key of the record in memory.

In one embodiment, the validation engine 304 includes multiple validation threads. One of the validation threads can be a main validation thread can continuously loop through the validation states of partitions, across all tables, which are marked as dirty. The main validation thread may spawn new validation threads to validate the partitions. Each of the partition validation threads perform the validation based on the validation configuration. The total number of partition validation thread count and partition validation thread count per table are configurable.

In one embodiment where the validation engine 304 is validating more than one partition of a table at the same time, instead of making n number of queries to retrieve the data, the validation engine 304 can make a single query to retrieve data from all the partitions (referred to as bulk record fetching).

In one embodiment of a full load task, the replication service can call a data validation engine with a record range and count to build the partitions. However, for tasks that do not do full load, the partitions may need to be built. In one embodiment, the DVT 300 includes a partition builder 312 to partition the data into multiple partitions. For example, the partition builder 312 can build the partition by making explicit queries to fetch every Nth record from the source and calling the validation engine with the record. If validation engine 304 gets the cdc events before this partitioning operation is completed, validation engine 304 will persist the primary key of record(s) modified from the cdc events to ensure the primary key of modified record(s) is not lost.

In one embodiment, an optional sorter 314 can be used to between the source stream 310 and the target stream 316. The sorter 314 can be used to identify changes to a particular partition being checked.

Figure 4:
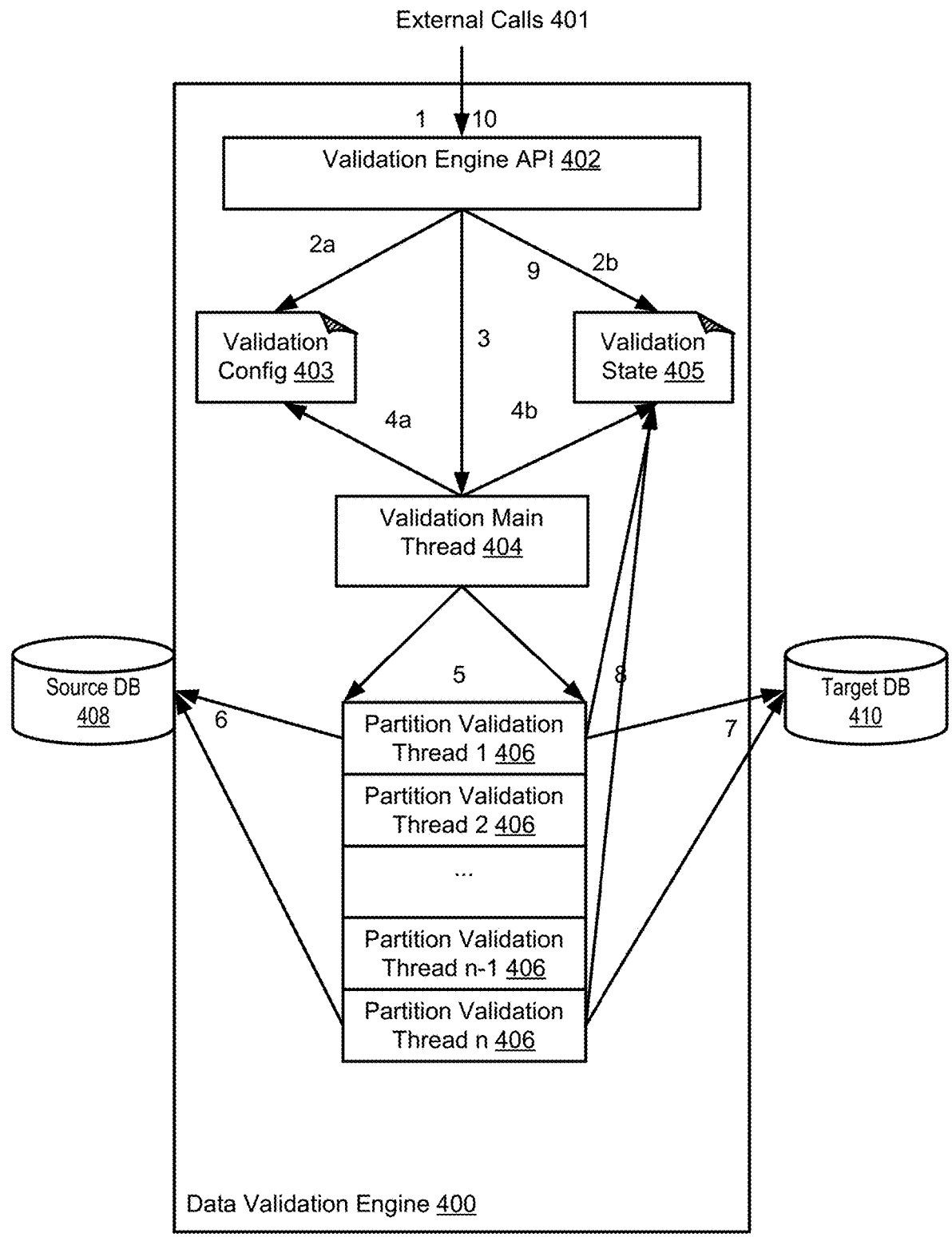
FIG. 4 is a block diagram of a logical view of components of a data validation engine of a DVT according to one embodiment.

FIG. 4 is a block diagram of a logical view of components of a data validation engine (DVE) 400 of a DVT according to one embodiment. FIG. 4 also shows a flow of interactions of the components of the DVE 400. Below are the details of each of the interactions numbered in the diagram.

1. Validation Engine API 402 will handle requests, including API calls 401 made to store validation configuration, to invoke the validation, to create partitions, etc., and the Validation Engine API 402 call appropriate components.
2a. Validation Engine API 402 makes calls to save a validation rule configuration 403.
2a. Validation Engine API 402 makes calls to save partition details into a validation state 405.
3. Validation Engine API 402 invokes a validation main thread 404, if needed, and passes the various validation commands to it.
4a. Validation main thread 404 makes calls to retrieve the validation rule configuration 403.

4b. Validation main thread 404 makes calls to retrieve the validation state 405.

5. Validation main thread 404 iterates over partitions, creates the partitions, if needed, and spawns a configured number of partition validation threads 406 for data comparison.

6. Each of the partition validation threads 406 reads the data from a source database 408 as needed for comparison.

7. Each of the partition validation threads 406 reads the data from a target database 410 as needed for comparison. Also, after the comparison, validation failure details may be saved in a table in the target database 410.

8. Partition validation threads 406 can compare the data and save the comparison results in the validation state 405.

9. Validation engine API 402 retrieves data from the validation state 405 to expose the validation results.

10. API calls 401 will be made to retrieve the validation results from the validation state 405.

It should be noted that the flow of interactions illustrated and described are set forth as just one possible scenario. In other embodiments, the flow of interactions may be organized in other ways and may include more or less interactions than those illustrated and described with respect to FIG. 4.

Although not illustrated in FIG. 4, the data validation engine 400 can interact with a rule processing system. The rule processing system can take care of validating, and processing the configured rules. A rule validator can be used to make sure all validation rules are valid. For example, the rule validator can perform the following: 1. Rule syntax validation to ensure the validation rule is syntactically correct; 2. Compare Function validation to ensure functions are supported; 3. Column type validation to ensure that columns and column types are supported. It should be noted that columns for which transformation rules are defined and columns for which results in incompatible type conversions may not be supported. For example, the rule validator can maintain an incompatible type conversion matrix, which may contain source data type, source database engine, target database engine, for identifying whether the column can participate in the validation.

In another embodiment, the rule processing system can perform various rule processing, such as inspecting the validation rules and combining them wherever possible to make as few independent queries as possible for each table. For instance, if there are two rules, one to compare the value of a column, and another to validate the checksum of a different column from the same table, the rule processing system can combine them into a single query. An example query is shown in the following expression: "select select id, value, cksum(description) from product where id>18000 and id<=19000."

Similarly, if there are three grouping validation functions, one to find the average of one column, one to find the sum of a column and another to find the average of description checksum, the rule processing system would combine them together. An example query is shown in the following expression: "select select avg(price), sum(quantity), avg (cksum(description)) from product where id>18000 and id<=19000 group by price, quantity, description."

If there are two rules of different types, one row-level type, and another group-level type, the data validation engine 400 could just make query to fetch the rows and then later apply the group function itself to avoid running multiple queries on database. This optimization may be performed only when it will result in better performance. It should be noted that merging validation rules to create a single query may not be possible if each rule has a different filter.

In some implementations, the format of the validation rules can follow similar conventions used for existing rule formats, such as mapping rules, transformation rules, or the like.

Below is the format of a sample validation rule. The below rule will select/retrieve the value of column "id" from the source and target and compare it.

{
  "rule-type": "validation",
  "rule-id": "1",
  "rule-name": "check id",
  "object-locator": {
    "schema-name": "%",
    "table-name": "%",
    "column-name": "%"
  },
  "rule-action": "compare",
  "compare-function": "select(id)"
}

The rule-type specifies the type of rule and indicates that it is a validation rule. The object-locator may specify a table by using schema and table name. The name must be from the source database in case they are different due to transformations. In some cases, the schema_name and table_name are mandatory; however, if a customer wanted to select every schema and table from the selection rules then they can just use wildcard '%' for both of them. The wildcards may also be used in a string (e.g., prefix %). The rule-action specifies what action this rule is going to do to validate the data, such as a "compare" action. Compare-function specifies what functions to apply to the data while comparing them. The compare_functions can either be applied to the specified columns for a row or a group of rows. The compare function which can be applied over a number of rows would be prefixed with "group.". A function can either take a list of columns or a list of functions as the parameters for the function. If no parameters are specified for the function, the columns participating in primary key or one of the unique indexes will be used. If compare-function is not specified, then a default compare-function based on the data type will be used to compare the columns(s) matching the rule. A list of some default compare functions based on the data type is specified below in Table 3:

TABLE 3

| Default Compare Function | Description |
| --- | --- |
| select( ) | retrieve the value of the column from the row |
| cksum( ) | find the check sum of the column from the row |
| group.avg( ) | find the average value of the column across a group of rows |
| group.count( ) | find the number of rows in the group of rows |

It should be noted that if more than one rule is present for a column with exact same schema and table values, all the validations will be performed. A function can also take another function as input. For instance 'group.avg(cksum( ))' is a valid function. These rules also support filters to choose rows matching a specific criterion for comparison. Columns participating in the filter rules should be a primary/unique key. For composite keys, all of them should participate in the filter. In the following validation rule below, validation would happen only for rows which has id value greater than or equal to 100000.
```
{
"rule-type": "validation",
"rule-id": "1",
"rule-name": "check id",
"object-locator": {
   "schema-name": "%",
   "table-name": "%",
   "column-name": "%"
},
"rule-action": "compare",
"compare-function": "select(id)"
"filters": [{
   "filter-type": "source",
   "column-name": "id",
   "filter-conditions": [{
      "filter-operator": "gte",
      "value": "100000"
   }]
}]
}
```
The filter rule can be expanded to support a random function to randomly choose a percentage of rows for validation. In the below function, 10% of rows would be randomly compared.
```
{
"rule-type": "validation",
"rule-id": "1",
"rule-name": "check id",
"object-locator": {
   "schema-name": "%",
   "table-name": "%",
   "column-name": "%"
},
"rule-action": "compare",
"compare-function": "select(id)"
"filters": [{
   "filter-type": "source",
   "column-function": "random(100)",
   "filter-conditions": [{
      "filter-operator": "gte",
      "value": "90"
   }]
}]
}
```
The following validation rule below will compare the count of rows across all tables.
```
{
"rule-type": "validation",
"rule-id": "1",
"rule-name": "check id",
"object-locator": {
   "schema-name": "%",
   "table-name": "%",
   "column-name": "%"
},
"rule-action": "compare",
"compare-function": "group.count( )"
}
```
The following validation rule below will compare the average of checksum of description columns across all tables.
```
{
"rule-type": "validation",
"rule-id": "1",
```
```
"rule-name": "check id",
"object-locator": {
   "schema-name": "%",
   "table-name": "%",
   "column-name": "%"
},
"rule-action": "compare",
"compare-function": "group.avg(cksum(description))"
}
```
The following validation rule below will find the checksum of all columns which ends with "Doc" across all tables and use that for validation.
```
{
"rule-type": "validation",
"rule-id": "1",
"rule-name": "check id",
"object-locator": {
   "schema-name": "%",
   "table-name": "%",
   "column-name": "% Doc"
},
"rule-action": "compare",
"compare-function": "cksum(*)"
}
```
The following validation rule below will compare data in each and every column by applying default compare functions based on the data type of each column.
```
{
"rule-type": "validation",
"rule-id": "1",
"rule-name": "check id",
"object-locator": {
   "schema-name": "%",
   "table-name": "%",
   "column-name": "%"
},
"rule-action": "compare"
}
```
Various default compare functions for the various data types can be used as set forth in Table 4.

TABLE 4

| Data Type | Default Compare Function |
| --- | --- |
| STRING | cksum( ) |
| WSTRING | cksum( ) |
| BOOLEAN | select( ) |
| DATE | select( ) |
| TIME | select( ) |
| DATETIME | select( ) |
| INT1 | select( ) |
| INT2 | select( ) |
| INT4 | select( ) |
| INT8 | select( ) |
| NUMERIC | select( ) |
| REAL4 | select( ) |
| REAL8 | select( ) |
| UINT1 | select( ) |
| UINT2 | select( ) |
| UINT4 | select( ) |
| UINT8 | select( ) |
| BLOB | cksum( ) |
| CLOB | cksum( ) |
| NCLOB | cksum( ) |

In one embodiment where the data validation tool is integrated in a DMS, various task settings can be added to support validation. The validation settings may be defined in the following expressions:

ValidationSettings
{
ValidationEnabled: Indicates if validation is enabled or not. Default is false.
MinRecordCountToWait: When the record count exceeds the configured threshold to initiate the validation
MaxPartitionSize: Initial partition size
MinPartitionSize: the partition will be split into multiple smaller partitions until the number of keys in the partition becomes <=minGroupSize
MaxTimeToWait: maximum time data validation tool waits before starting the validation
MinTimeToWait: is the minimum time to wait before starting the validation for a row
PartitionEvaluationThresholdCount: Indicate the count of rows which need to be modified in a partition before the data validation tool re-evaluates it.
FullLoadValidationBehavior: DuringFullLoad/AfterFullLoad
CdcValidationBehaviour: ChangesDuringCdc/FullDuringCdc
ValidationThreadCount: default value is 8
MaxValidationFailureReportCount: default is 1000
}

Figure 5:
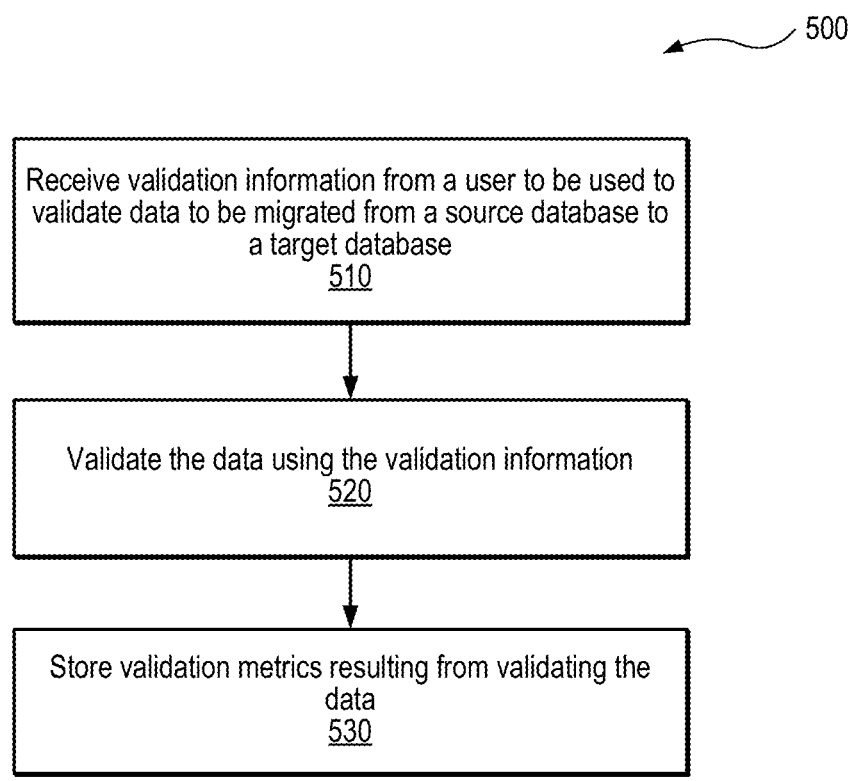
FIG. 5 illustrates a flowchart that provides an example of a process executed by a data validation tool, according to various embodiments.

FIG. 5 illustrates a flowchart that provides an example of a process 500 executed by a data validation tool, according to various embodiments. It is understood that the flowchart of FIG. 5 provides an example of the many different types of functional arrangements that may be employed to implement the operation of the data validation tool (or data validation engine) as described herein. Process 500 may be performed by a processing logic that may comprise hardware (e.g., circuitry, dedicated logic, programmable logic, microcode, etc.), software (e.g., instructions run on a processing device), or a combination thereof. In one embodiment, the data validation tool 118 of FIG. 1 executes the process 500 to validate data migrated from a source database to a target database. In another embodiment, the data validation tool 200 of FIG. 2 executes the process 500. In another embodiment, the data validation tool 300 of FIG. 3 executes the process 500. In another embodiment, the data validation engine 400 of FIG. 4 performs the process 500.

In block 510, validation information is received from a user to be used to validate data to be migrated from a source database to a target database. The validation information may indicate a level of data validation to be used to validate the data. The validation information may include validation rules, configuration functions, or the like, as described herein. The validation rule(s) may indicate how to compare the data. For example, the validation rule can specify how to compare partitions of a source data set to corresponding partitions of a target data set. The validation rules can be configured by the user or may be predefined validation rules. The validation information may also include information to add, remove, or modify application rules. The validation rules may be commensurate with the level of data validation. In one embodiment, the source database and the target database are homogeneous databases. In another embodiment, the source database and the target database are heterogeneous databases.

In block 520, the data is validated using the validation information. In one embodiment, the data is validated by applying one or more validation rules to the source data set and the target data set to compare the data. In one embodiment, the source data set is partitioned into multiple partitions and the target data set is partitioned into corresponding partitions. The validation rule is applied to a first partition of the source data set and a corresponding first partition of the target data set.

In block 530, validation metrics resulting from the validating the data at block 320 are stored. In one example, a validation status of the first partitions, resulting from the application of the validation rule, is stored. In another embodiment, additional details of the validation are stored. The additional details can be used by a customer to identify and possibly remedy failures in the data validation process.

There are various possible approaches to perform data validation of migrated data. Considering the different dimensions of the problem with large databases and non-static databases, including data volume, data consistency, and resource utilization. To address these problems described herein, the data validation tool can execute a process that permits data validation on large, non-static databases that are subject to changes. The data validation tool can also be configurable to validate the migrated data with varying levels of data validation based on validation information received from the user. One possible approach is described below with respect to FIG. 6.

Figure 6:
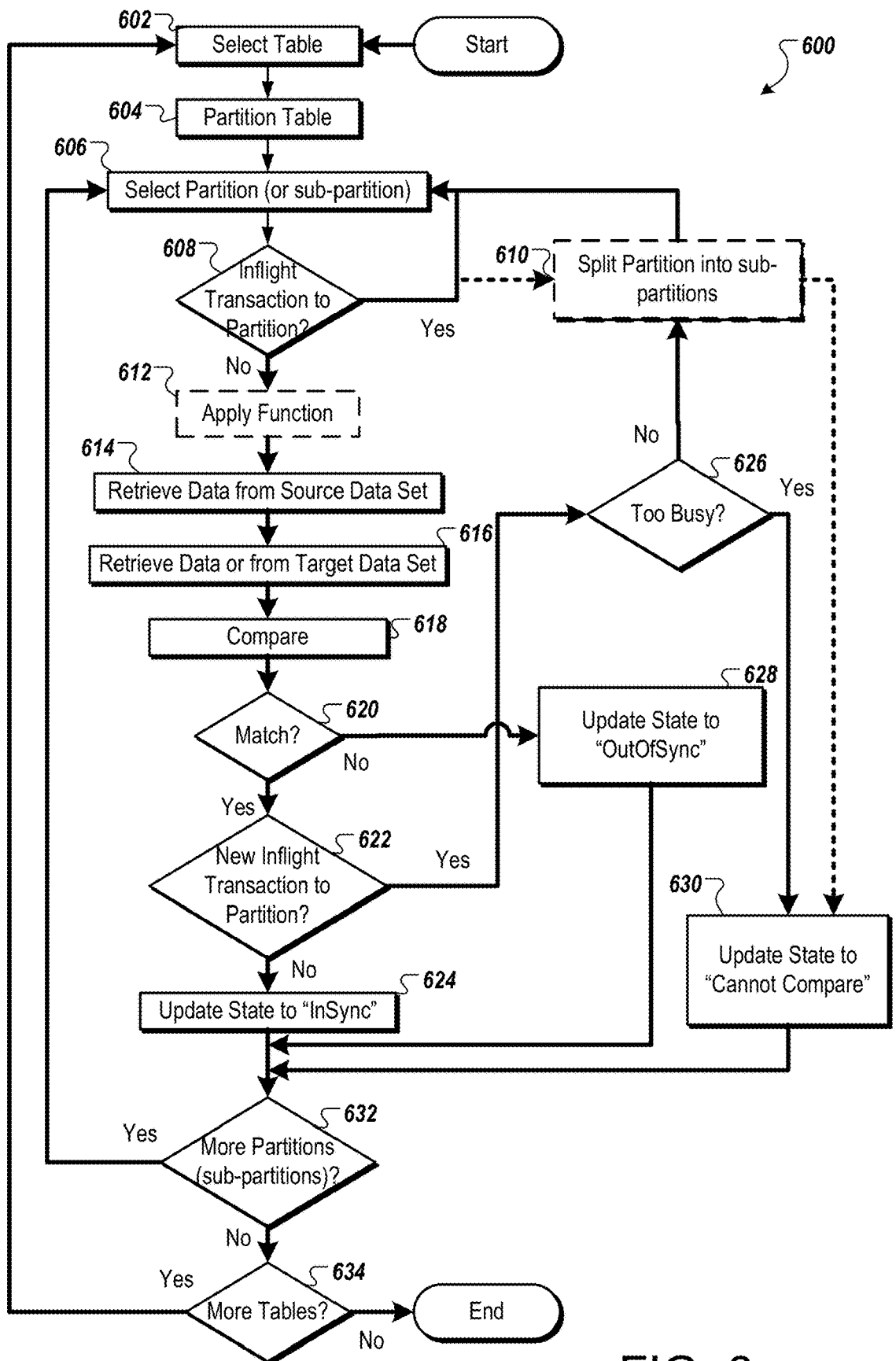
FIG. 6 illustrates a flowchart that provides another example of a process executed by a data validation tool according to another embodiment.

FIG. 6 illustrates a flowchart that provides another example of a process 600 executed by a data validation tool according to another embodiment. In one embodiment, the process 600 illustrated in FIG. 6 is directed to an embodiment wherein data is validated by the data validation tool (or data validation engine). In one embodiment, the data validation tool 118 of FIG. 1 executes the process 600 to validate data migrated from a source database to a target database. In another embodiment, the data validation tool 200 of FIG. 2 executes the process 600. In another embodiment, the data validation tool 300 of FIG. 3 executes the process 600. In another embodiment, the data validation engine 400 of FIG. 4 performs the process 600.

At block 602, the processing logic begins with selecting a table, as a task can have a number of tables that are to be compared. In order to compare a single table, the processing logic partitions the selected table into multiple partitions (e.g., group of contiguous rows based on the primary key) (block 604). The processing logic iterates through the partitions of the table to compare them. More specifically, at block 606, the processing logic selects one of the partitions, such as the first partition at a first instance or a subsequent partition as the processing logic iterates through the partitions.

Because the data in the source database may not be static, the processing logic can still validate portions of the source data set that is not changing using various techniques, including changing the granularity of the partition size, as specified in the validation information received from the user or set as default parameters. In one embodiment, as illustrated in the process 600 of FIG. 6, at block 608, the processing logic checks if there are any inflight transactions to the partition. An inflight transaction is an update made to any row in the partition selected at block 606. In one embodiment, the processing logic can check a cdc event stream of the source database to determine if there are any inflight transactions to the selected partition. Since the partition can be identified by the primary key(s) of the row or group of rows, the cdc event stream can be checked for changes to the rows of the partition using the primary key(s) of the partition (e.g., by a primary key and range identifying the partition or by a start key and an end key). If there are changes to the selected partition at block 608, the processing logic can iterate to the next partition, returning to block 606 to select the next partition. However, if the number of partitions having changes is greater than a threshold value (configured or predefined as defined in the validation information), the processing logic can optionally split the partition into multiple sub-partitions at block 610, returning to block 606 to select one of the multiple sub-partitions. In another embodiment, at block 610, the partition can be split into sub-partitions when the selected partition is too busy, such as when a number of changes being made to the selected partition exceeds a threshold value (configured or predefined in the validation information). Alternatively, at block 610, the selected partition can be split into sub-partitions without a determination of the number of partitions with changes or a number of changes within the selected partition. In some cases when the number of changes in a partition, or a size of the partition exceeds a minimum threshold, the processing logic can update the state of the selected partition as the "Cannot Compare" state at block 630, and return to block 632. The CannotCompare state indicates that the records of the partition could not be compared as the rows of the partition were too busy to compare and the rows of the partition can be compared at a later point in time.

At block 614, the processing logic can query the source database to retrieve data from the source data set corresponding to the partition (block 614) and can query the target database to retrieve data from the target data set corresponding to the partition (block 616). The processing logic can retrieve the data from all rows of the partition in the source database for comparing with the data from all rows of the partition in the target database. The processing logic can compare the data from the source data set and the data from the target data set to see if they match (block 618). At block 620, the processing logic determines whether the comparison is a match. If the data does not match at block 620, the processing logic updates a state of the selected partition to the "OutOfSync," state and returns to block 632. The "OutOfSync" state identifies the records of the partition as unmatched records in the two databases. It should be noted that a future update on the source data set might change a record from being considered unmatched to matched.

In one embodiment, the processing logic can apply one or more functions to some or all of the columns (optional block 612) to reduce the amount of data to be transferred for the comparison. For example, instead of querying for all rows of the partition to be retrieved from both databases, the processing logic can use a count function, an average function, an average checksum function, a row equality function, or the like, and query the databases accordingly. Alternatively, the processing logic can instruct the respective database to apply a function on a number of rows and retrieve a final value alone, instead of fetching individual rows. This may be used to reduce the amount of data transferred for data comparison and to reduce the amount of time for the data comparison. For instance, instead of retrieving all the rows to compare a column, the processing logic could retrieve values resulting from the functions (e.g., count, average, sum, row equality, or the like) at blocks 614 and 616 and compare the retrieved values at block 618. Since the processing logic does not retrieve every row when a function is applied, the application of the function at block 612 may improve performance of the data validation in process 600. It should be noted that the size of the partition and the number of partitions that can be processed at a time are parameters of the process 600 that are configurable by the user as described herein. Also, the validation rules can specify the comparison function at block 618 and whether the processing logic makes queries to retrieve all the rows in the partition or queries to retrieve the value of a function applied to the rows in the partition. The validation rules can also be configured by the user as described herein.

It should be noted that if any row in the partition (i.e., group of rows) changes during the time of comparison, the processing logic would have to re-compare everything or the rows that have changed to validate the partition. Because the data in the source database may not be static, the processing logic may need to confirm that the data has still not changed since the time data was retrieved for comparison at block 618. As such, at block 620, the processing logic can check whether there have been any new inflight transactions to the selected partition since the data was retrieved for the comparison at block 618. In some cases, this may result in too many re-comparisons to validate a group of rows. In one embodiment, as illustrated at block 626 in the process 600 of FIG. 6, the processing logic can determine that the selected partition is too busy for data validation. For example, the processing logic can determine if a number of inflight transactions in the selected partition exceeds a threshold value. If the selected partition is not too busy at block 626, the processing logic can return to block 606 and may split the selected partition into multiple sub-partitions at block 610 when configured by the validation information. If the selection partition is too busy at block 626, the processing logic can update the state of the selected partition to "Cannot Compare" state at block 630 and returns to block 632. The CannotCompare state indicates that the records of the partition could not be compared as the rows of the partition were too busy to compare and the rows of the partition can be compared at a later point in time.

If the data matches at block 620 and there are no inflight transactions (e.g., rows in the partition are not getting modified) for the selected partition at block 622, the processing logic can update the state of the selected partition to "InSync" state at block 624 and proceeds to block 632 where the processing logic determines whether there are more partitions (or sub-partitions) in the table to be compared for data validation. If there are more partitions to be validated at block 632, the processing logic returns to block 606, selecting another partition. If there are no more partitions to be validated at block 632, the processing logic proceeds to block 634 where the processing logic determines whether there are more tables in the source data set. If there are more tables to be validated at block 634, the processing logic returns to block 602 to select another table. If there are no more tables to be validated at block 634, the processing logic ends the process 600.

As described herein, in one embodiment, if the partition comparison query results are not matching, then processing logic splits the partition into smaller partitions, referred to herein as sub-partitions, and perform the comparison on these smaller partitions. If any partition does not match after the split, processing logic will further split them to smaller partitions at block 610 and compares the data gain, but with the partition size being a smaller level of granularity. Processing logic can perform the splitting and comparison a number of times until the partition size becomes a configurable value (size can be as low as 1). If any of the partitions are not matching even after size becomes configured minimum value, then processing logic will make them as "OutOfSync" in case if there are no inflight transactions for those rows. If processing logic find there are inflight transactions for the rows which are not matching then processing logic mark them as "Cannot Compare" at block 630 and saves information to compare these records at a later point of time.

In one embodiment, when there is an update in the source database table, after validation is started for the same table, processing logic can map the key of the row retrieved from the update event to the appropriate partition, and save that key for comparison at a later point in time. If there are a configurable percentage of rows changed in the same partition, for example, the processing logic can re-compare the entire partition, otherwise processing logic simply compares the changed rows alone.

In some embodiments, before making queries for comparing a partition, the processing logic can check for any inflight transactions for the same partition and make the query only when there are no inflight transactions. After fetching the data from source and target databases, processing logic check if there is an inflight transaction for the same partition and throw away the results when it does not match since the processing logic may not have a reliable way to tell if processing logic indeed compared the same version of data. If the partition continues to have inflight transactions (e.g., at block 626), then processing logic splits the partition into smaller sizes (e.g., at block 610) and then compares the partitions which does not have inflight transactions. Processing logic can split the partitions until the size is a configured minimum value. At this point, processing logic knows the exact rows having inflight transaction(s). If the rows still have inflight transactions in the subsequent comparison as well, then processing logic marks them as the "Cannot Compare" state and save them to compare at a later point of time.

Figure 7:
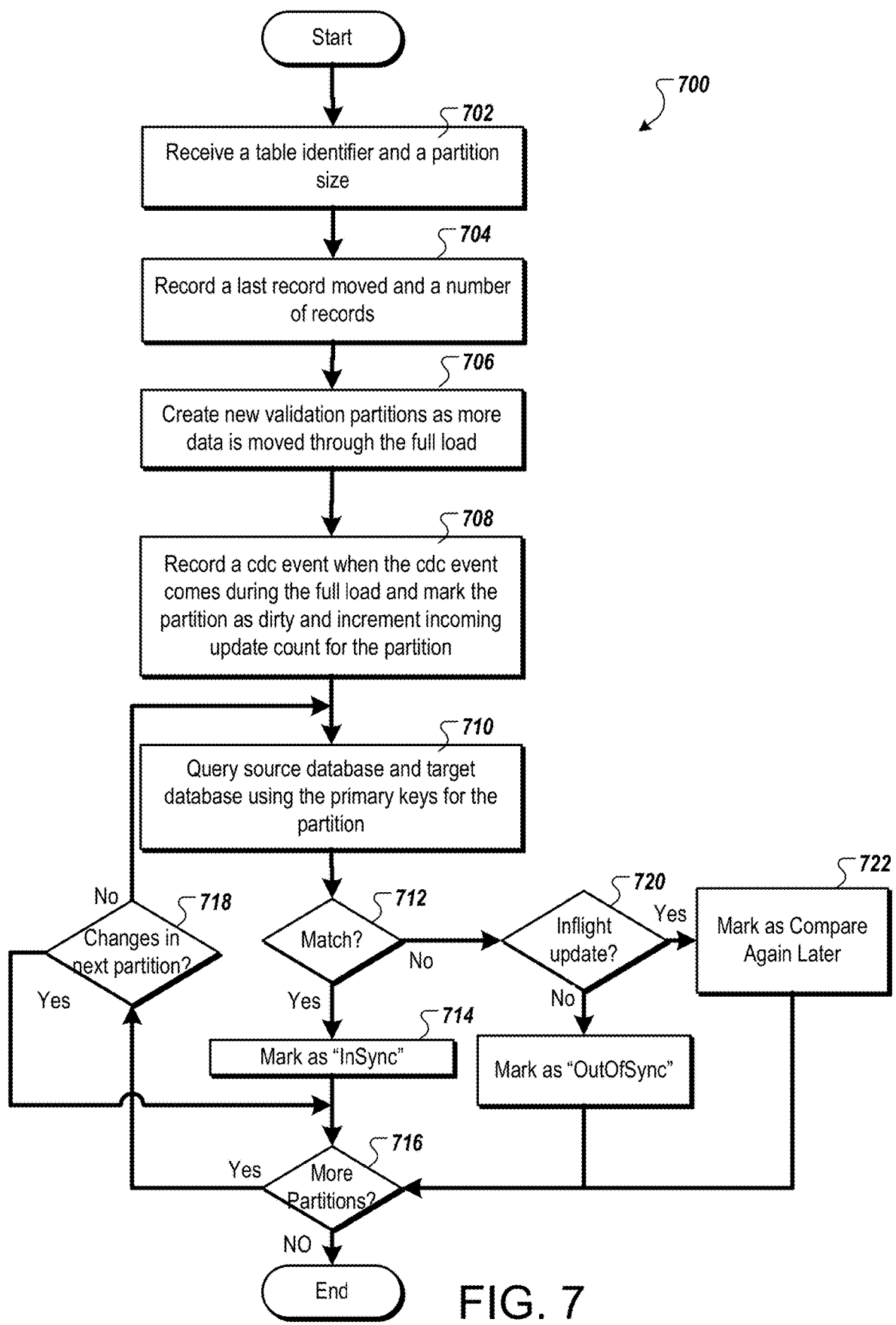
FIG. 7 illustrates a flowchart that provides another example of a process executed by a data validation tool according to another embodiment.

FIG. 7 illustrates a flowchart that provides another example of a process 700 executed by a data validation tool according to another embodiment. In one embodiment, the process 700 illustrated in FIG. 7 is directed to an embodiment wherein migrated data is validated by the data validation tool. The process 700 is described as a simple example of a validation which has just one table of a billion records. Various operations of the process 700 refer back to the components of data validation tool 300 of FIG. 3, but the operations of the process 700 may be performed by other components.

At block 702, processing logic begins with receiving a table identifier and a partition size as inputs. Continuing with the example of a billion records in the table and the partition size being configured as 100,000, there will be 10,000 partitions for the table. The processing logic may need almost 2 MB for saving partition states, provided on average 200 bytes are needed to store the state of a single partition (e.g., 200*10000 bytes=1.91 MB). At block 704, when a full load starts moving the records, the data validation engine 304 (also referred to as a validator) will be called to record the last record in a list of records that it just moved and a number of records. At block 706, the validation state manager 308 creates new validation partitions as more data is moved through full load.

When a change event comes during full load is in progress, the cdc events (which are cached events) can be persisted on a disk by the DMS (or replication service). The DMS knows the primary key from the cdc event and calls the data validation engine 304 to record this information when the cdc event occurs during the full load at block 708. The data validation engine 304 can detect the partition to which the update belongs to, marking the partition as dirty and incrementing an incoming update count for the partition at block 708. It should be noted that when the DMS (or replication service) applies a change to the target data set, then an outgoing update count will be incremented by 1. It should be noted that the validation engine 304 (or other process) can be listening for cdc events during the full load.

At block 710, the data validation engine 304 can query the source database and the target database using the primary keys for the partition in order to retrieve data or results of a function applied to the data for a comparison to see if the data matches. For example, a row-level query to retrieve the check sum of a varchar column along with primary keys for a partition would look like the example query below.

select id, cksum(description) from product where id>10000 and id<=20000; Also, it should be noted that, if row-level comparison is enabled, the primary key comparison would be performed always. For another example, a group-level query to retrieve the average value of primary key column and average of check sum along with count would look like the example query below.

select count(*), avg(id), avg(cksum(description)) from product where id >10000 and id<=20000;

Referring back to FIG. 6, if the values retrieved from the source and target databases matches at block 712, then processing logic marks the partition as "InSync" (from dirty or "OutOfSync") at block 714 and moves to next partition P2, returning to block 710. In particular, the processing logic can determine whether there are more partitions in the table at block 716. Also, before querying the source database and target database for the next partition, the processing logic can determine whether there are in flight transactions for the next partition at block 718. Assuming there are inflight transactions for the next partition P2 at block 718, then processing logic skips the next partition and moves to the next partition P3. In particular, the processing logic returns to block 716 and determines there is the next partition P3. Assuming there are no inflight transactions for the partition P3 at block 718, the processing logic makes the queries to source and target databases at block 710. If the values do not match at block 712 and if the incoming update count had increased during the query, indicating there is an inflight update in the source database at block 720, processing logic marks the partition to compare again later (CannotCompare) and moves on to next partition P4 via block 716. Assuming there are no inflight transactions for the partition P4, processing logic make the queries to source and target databases for the partition P4 at block 710. If the values do not match at block 712 and if there are no inflight updates at block 720, then the processing logic marks the partition P4 as out of sync (OutOfSync). When there are no more partitions in the table at block 716, the process 700 ends.

In some cases, if processing logic uses a row-level compare function, it would be easy to find which rows are not matching since processing logic already has the data. Processing logic inserts OutOfSync rows to a target result table and updates validation metrics as well. Then processing logic can move to next partition at block 716. If the processing logic uses a group-level compare function then, in order to find exactly which keys are not in sync, processing logic may further split the partition into smaller partitions, referred to herein as sub-partitions. Processing logic then compares the sub-partitions using a query, such as an example query: "select count(*), avg(id), avg(cksum(description)) from product where id >18000 and id<=19000 group by id, description."

If any of the smaller sub-partitions is not in sync, then processing logic can further split into yet smaller partitions. Even if they are not in sync after spitting multiple times, the processing logic can eventually convert the group-level query to a row-level query as shown in the example query: "select id, cksum(description) from product where id >18000 and id<=19000."

The above query would identify which rows are not in sync and processing logic can insert those primary keys into the target result table. The processing logic can also expose the out of sync metrics to the customer. In some cases, once processing logic identifies the sub-partition as out of sync, processing logic always treat that this sub-partition as an independent partition as processing logic knows further group-level queries will not succeed. In some cases, adjacent sub-partitions which are in sync can be merged as a single partition. Once the out of sync record count exceeds a certain threshold, the processing logic can stop inserting them into the target result table.

In a further embodiment, once the processing logic finishes a first round of iteration over all partitions, processing logic can return to iterate over the partitions which are still dirty. If the partition was not compared due to inflight transaction for a predefined number of iterations then processing logic can create sub-partitions and compare the sub-partitions as described herein. If the sub partitions have inflight transactions then processing logic would fallback to row-level queries. If the row-level comparison cannot be performed for some rows due to inflight transactions, then processing logic will save them for later comparison. If certain rows continue to have inflight transaction even after multiple attempts to re-compare, then processing logic can report them are cannot be compared and insert those primary key in the target result table to notify customer which keys were not compared.

If there are many inflight for a next partition P5 and processing logic cannot validate the partition using a group-level query, processing logic can split the partition into smaller partitions. Processing logic can make queries to find every Nth record within the partition to get the boundary of the sub-partitions. Processing logic then compares the sub-partition using a query, such as the example query: "select count(*), avg(id), avg(cksum(description)) from product where id >18000 and id<=19000 group by id, description."

If any of the smaller sub-partitions is not in sync, then processing logic can further split the sub-partition into yet smaller sub-partitions and, if even then, they are not in sync, then processing logic can convert the group-level query to a row-level query, such as the example query: "select id, cksum(description) from product where id >18000 and id<=19000."

The above query would identify which rows are not in sync. This would help the processing logic validate all the rows without inflight transactions. The rows with inflight transaction can be saved to compare for later. In some cases, if the same rows continue to get updates, then they will be marked as "Cannot Be Validated" after a configurable number of attempts to retry the comparison. This partition would be marked as dirty until it can be compared, such as when the updates to those rows stop.

After validating each partition, the processing logic can save the partition state. The threads which do the validation can find the next dirty partition and can spawn a new thread to validate that partition. Once the partitions for a table are processed, it will move on to process the dirty partition from the next partition.

In another embodiment of another process, the processing logic receives a selection of a validation rule from among multiple validation rules, each of the validation rules corresponding to a different level of validation of a migration of a first data set from a source database to a second data set in a target database. The processing logic partitions the first data set to obtain a first partition of data that is less than the first data set and partitions the second data set to obtain a second partition of data that is less than the second data set and that corresponds to the first partition. The processing logic applies the validation rule to for a first comparison of the first partition to the second partition to validate the data of first partition and the second partition. The processing logic stores a validation status of a result of the first comparison for the migration of the first partition and updates and stores validation metrics of the migration of based on the validation status. For example, the processing logic can calculate a validation metric or update a validation metric based on an outcome of the validation rule being applied to the first and second partitions. The validation metrics may be counts of the different validation statuses or the like.

Alternatively, the processing logic stores validation metrics resulting from an application of the validation rule to the first partition and the second partition. In a further embodiment, the processing logic partitions the first data set to obtain a third partition of data that is less than the first data set and partitions the second data set to obtain a fourth partition of data that is less than the second data set. The processing logic applies the validation rule to the third partition and the fourth partition to validate the third partition and the fourth partition. The processing logic stores another validation status resulting from an application of the validation rule to the third and fourth partitions and updates the validation metrics. Alternatively, the processing logic stores additional validation metrics resulting from an application of the validation rule to the third and fourth partitions.

In one embodiment, the processing logic determines a set of validation metrics from the validation status (and the additional validation status). The set of validation metrics may include a total number of rows migrated during the migration, a first number of rows compared during the migration, a second number of rows that are synchronized during the migration, a third number of rows that are not synchronized during the migration, a fourth number of rows that are not comparable due to ongoing changes during the migration.

In another embodiment, the processing logic determines whether a number of rows of the first partition that are not comparable, due to ongoing changes during the migration, exceeds a threshold number. When the number exceeds the threshold number, the processing logic can split the first and second partitions into sub-partitions and apply the validation rule to the sub-partitions, on a sub-partition basis similar to the partition basis described above. The processing logic can receive input to set or adjust the threshold number. The threshold number could be defined as a percentage, a proportion, an actual number, or the like.

In a further embodiment, the processing logic receives a validation request in connection with a migration task that migrates a first data set from a source database to a second data set in a target database. The validation request may be received at the creation of the migration task, during the execution of the migration task, as well as after the data has been migrated in part or in whole.

Figure 8:
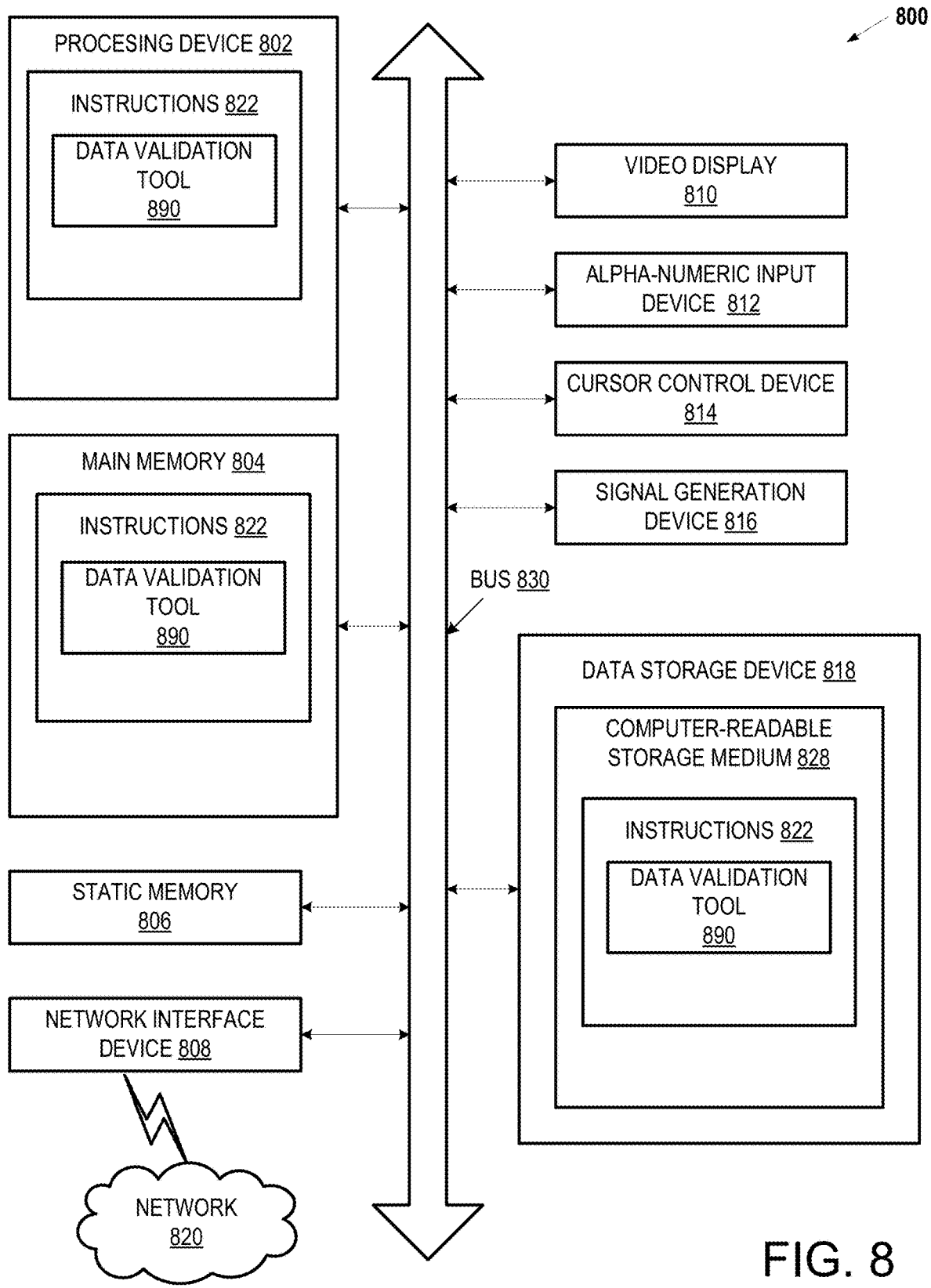
FIG. 8 is a schematic block diagram that provides an example illustration of a computing environment executing instructions relating to deploying an application, according to one embodiment.

FIG. 8 illustrates a diagrammatic representation of a machine in the example form of a computer system 800 including a set of instructions 822 executable by a data validation tool 890 to cause the system to perform any one or more of the methodologies discussed herein. In one embodiment, the data validation tool 890 may include instructions 822 to enable execution of the processes and corresponding components shown and described in connection with FIGS. 1-7 and 9A-10B.

In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions 822 (sequential or otherwise) that specify actions to be taken by that machine. Further, while a single machine is illustrated, the term "machine" shall also be taken to include any collection of machines that individually or jointly execute a set (or multiple sets) of instructions 822 to perform any one or more of the methodologies discussed herein The example computer system 600 includes a processing device (processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 818, which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. In various implementations of the present disclosure, the processing device 802 is configured to execute instructions 822 for the data validation tool 890 for performing the operations and processes described herein.

The computer system 600 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-readable medium 828 on which is stored one or more sets of instructions 822 of the data validation tool 890 embodying any one or more of the methodologies or functions described herein. One or more machine-readable mediums having stored thereon one or more instructions, which if performed by one or more processors, cause the one or more processors to at least any of the operations described herein.

The instructions may also reside, completely or at least partially, within the main memory 804 and/or within processing logic of the processing device 802 during execution thereof by the computer system 800, the main memory 804 and the processing device 802 also constituting computer-readable media.

The instructions 822 may further be transmitted or received over a network 820 via the network interface device 808. While the computer-readable storage medium 828 is shown in an example embodiment to be a single medium, the term "computer-readable storage medium" should be taken to include a single medium or multiple media (e.g., a centralized or distributed database, and/or associated caches and servers) that store the one or more sets of instructions 822. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "identifying", "saving", "pausing", "determining", "applying", "causing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    receiving, by a data validation tool (DVT) executed by a processer, validation information to be used to validate data to be migrated from a source database to a target database, wherein the validation information comprises at least one user-defined validation rule corresponding to a level of data validation, the at least one user-defined validation rule indicating how to compare a partition of the source database to a corresponding partition of the target database;
    partitioning, by the DVT, the source database into a plurality of partitions of rows of data comprising at least a first partition of rows and a second partition of rows;
    migrating the first partition of rows from the source database to the target database;
    validating, by the DVT, data within the first partition of rows within the source database and the target database using the validation information, wherein validating the data is done while the first partition of rows is being migrated;
    determining, by the DVT, that the first partition has a number of rows that are currently changing and that the number is greater than a threshold value;
    splitting, by the DVT responsive to a determination that the number of rows that are currently changing is greater than the threshold value, the first partition into a plurality of sub-partitions comprising at least a first sub-partition of rows and a second sub-partition of rows, the second sub-partition of rows comprising rows that are currently changing;
    validating, by the DVT, the data within the first sub-partition using the validation information;
    marking, by the DVT, the second sub-partition to be validated at a later time; and
    storing, by the DVT, validation metrics resulting from validating the data within the first sub-partition.

2. The method of claim 1, further comprising determining from the validation information a level of data validation to be used to validate the data within the first partition and the data within the second partition.

3. The method of claim 2, wherein the validating the data within the first partition comprises applying the at least one user-defined validation rule commensurate with the level of data validation.

4. The method of claim 1, wherein the validating the data within the first partition comprises:
    partitioning the target database into a second plurality of partitions of rows of target data comprising at least a first target partition of target rows and a second target partition of target rows;
    applying the at least one user-defined validation rule for a first comparison of the data within the first partition to the target data within the first target partition; and
    storing a first validation status comprising a first result of the first comparison, wherein the first validation status is at least one of matched or unmatched resulting from applying the at least one user-defined validation rule.

5. The method of claim 4, further comprising determining validation metrics based at least in part on the first validation status.

6. The method of claim 4, wherein the validating the data within the first partition further comprises:
    checking whether the data within the first partition has changed before applying the at least one user-defined validation rule, wherein the data within the first partition has not changed as a result of the first partition not having any change data capture (cdc) events occurring between a first time and a second time; and
    applying the at least one user-defined validation rule responsive to a determination that the data within the first partition has not changed.

7. The method of claim 4, further comprising validating the data within the second partition, wherein the validating the data within the second partition comprises:
    applying the at least one user-defined validation rule for a second comparison of the data within the second partition of rows to the target data within the second target partition of target rows;
    checking whether the data within the second partition has changed after the at least one user-defined validation rule is applied, wherein the data within the second partition has changed as a result of the second partition having a change data capture (cdc) event between a first time and a second time; and
    storing a second validation status of the second partition as not being validated, responsive to a determination that the data within the second partition has changed after the at least one user-defined validation rule is applied.

8. The method of claim 4, further comprising validating the data within the second partition, wherein the validating the data within the second partition comprises:
    determining whether the second partition is too busy to be validated; and
    responsive to a determination that the second partition is too busy to be validated,
        splitting the second partition into a second plurality of sub-partitions comprising at least a third sub-partition of rows and a fourth sub-partition of rows;
        splitting the second target partition into a second plurality of target sub-partitions comprising at least a first target sub-partition of target rows and a second target sub-partition of target rows;

applying the at least one user-defined validation rule for a third comparison of data within the third sub-partition to data within the first target sub-partition; and storing a second validation status comprising a result of the third comparison.

9. The method of claim 1, wherein the plurality of partitions of rows of data further comprises a third partition of rows, wherein a validation failure table comprises i) a third primary key that identifies a row or a range of rows in the third partition that failed a first validation rule, ii) a first rule identifier that identifies the first validation rule; and iii) a second failure type of the first validation rule, wherein the second failure type indicates that the third partition is not validated and the third partition in the source database and the third partition in the target database are out of synchronization.

10. The method of claim 1, wherein the plurality of partitions of rows of data further comprises a third partition of rows and a fourth partition of rows, and wherein storing validation metrics comprises storing, by the DVT, the validation metrics in a status table, wherein the status table comprises:

a first entry for the first sub-partition, the first entry comprising a first status of the first sub-partition, the first status indicating that the first sub-partition is validated and the first sub-partition in the source database and a first sub-partition in the target database are in synchronization;

a second entry for the second sub-partition, the second entry comprising a second status of the second sub-partition, the second status indicating that the second sub-partition cannot be validated because the second sub-partition in the source database has a second number of rows that are currently changing and the second number of rows that are currently changing is greater than the threshold value;

a third entry for the third partition, the third entry comprising a third status of the third partition, the third status indicating that the third partition in the source database and a corresponding third partition in the target database are out of synchronization after all known updates are applied to the third partition in the source database and the corresponding third partition in the target database; and a fourth entry for the fourth partition, the fourth entry comprising a fourth status of the fourth partition, the fourth status indicating that the fourth partition is not yet validated because either the fourth partition in the source database and a corresponding fourth partition in the target database have never been compared or at least one of the fourth partition in the source database and the corresponding fourth partition in the target database has a third number of rows that is currently changing, the third number being greater than the threshold value.

11. The method of claim 1, wherein the at least one user-defined validation rule comprises multiple validation rules configured by a user, and wherein the marking the second sub-partition to be validated at the later time is responsive to determining that the second sub-partition in the source database and a corresponding second sub-partition in the target database are out of synchronization based on at least one of the multiple validation rules.

12. A system comprising:
a processor; and
a memory to store computer-executable instructions of a data validation tool (DVT) that, if executed, cause the processor to:
receive validation information to be used to validate data to be migrated from a source database to a target database, wherein the validation information comprises at least one user-defined validation rule corresponding to a level of data validation, the at least one user-defined validation rule indicating how to compare a partition of the source database to a corresponding partition of the target database;
partition the source database into a plurality of partitions of rows of data comprising at least a first partition of rows and a second partition of rows;
migrate the first partition of rows from the source database to the target database;
validate data within the first partition of rows within the source database and the target database using the validation information, wherein validating the data is done while the first partition of rows is being migrated;
determine that the first partition has a number of rows that are currently changing and that the number is greater than a threshold value;
split the first partition into a plurality of sub-partitions comprising at least a first sub-partition of rows and a second sub-partition of rows responsive to a determination that the number of rows that are currently changing is greater than the threshold value, the second sub-partition of rows comprising rows that are currently changing;
validate the data within the first sub-partition using the validation information;
mark the second sub-partition to be validated at a later time; and
store validation metrics resulting from validating the data within the first sub-partition.

13. The system of claim 12, wherein the processor is further to:
determine from the validation information a level of data validation to be used to validate the data within the first partition and the data within the second partition; and
apply the at least one user-defined validation rule commensurate with the level of data validation.

14. The system of claim 12, wherein the processor, to validate the data within the first partition, is to:
partition the target database into a second plurality of partitions of rows of target data comprising at least a first target partition of target rows and a second target partition of target rows;
apply the at least one user-defined validation rule for a first comparison of the data within the first partition to the target data within the first target partition; and
store a first validation status comprising a first result of the first comparison.

15. The system of claim 14, wherein the plurality of partitions of rows of data further comprises a third partition of rows, wherein the second plurality of partitions of rows of target data further comprises a third target partition of target rows, and wherein the processor is further to:
at a first time, determine that the third partition has no change data capture (cdc) events that have changed data within the third partition;

apply the at least one user-defined validation rule for a second comparison of the data within the third partition to the target data within the third target partition of target rows;

check whether the data within the third partition has changed after applying the at least one user-defined validation rule, wherein the data of the third partition has changed as a result of the third partition having a cdc event between the first time and a second time; and store a third validation status of the third partition as not being validated, responsive to a determination that the data within the third partition has changed after the at least one user-defined validation rule is applied.

16. The system of claim 14, wherein the processor, to validate the data within the first partition, is further to:

store the first validation status of the first partition as matched or unmatched resulting from the applying the at least one user-defined validation rule responsive to a determination that the data within the first partition has no change data capture (cdc) events after the at least one user-defined validation rule is applied.

17. The system of claim 14, wherein the processor is further to validate the data within the second partition, wherein the processor, to validate the data within the second partition, is to:

determine whether the second partition is too busy to be validated; and responsive to a determination that the second partition is too busy to be validated, split the second partition into a second plurality of sub-partitions comprising at least a third sub-partition of rows and a fourth sub-partition of rows;

split the second target partition into a second plurality of target sub-partitions comprising at least a first target sub-partition of target rows and a second target sub-partition of target rows;

apply the at least one user-defined validation rule for a third comparison of the third sub-partition to the first target sub-partition; and store a validation status comprising a result of the third comparison.

18. One or more non-transitory machine-readable mediums having stored thereon one or more instructions, which if performed by one or more processors executing a data validation tool (DVT), cause the one or more processors to at least:

receive validation information to be used to validate data to be migrated from a source database to a target database, wherein the validation information comprises at least one user-defined validation rule corresponding to a level of data validation, the at least one user-defined validation rule indicating how to compare a partition of the source database to a corresponding partition of the target database;

partition the source database into a plurality of partitions of rows of data comprising at least a first partition of rows and a second partition of rows;

migrate the first partition of rows from the source database to the target database;

validate the data within the first partition of rows within the source database and the target database using the validation information, wherein validating the data is done while the first partition of rows is being migrated;

determine that the first partition has a number of rows that are currently changing and that the number is greater than a threshold value;

split the first partition into a plurality of sub-partitions comprising at least a first sub-partition of rows and a second sub-partition of rows responsive to a determination that the number of rows that are currently changing is greater than the threshold value, the second sub-partition of rows comprising rows that are currently changing;

validate the data within the first sub-partition using the validation information;

mark the second sub-partition to be validated at a later time; and store validation metrics resulting from validating the data within the first sub-partition.

19. The one or more non-transitory machine-readable mediums of claim 18, wherein the one or more instructions cause the one or more processors further to:

determine from the validation information a level of data validation to be used to validate the data within the first partition and the data within the second partition; and apply the at least one user-defined validation rule commensurate with the level of data validation.

20. The one or more non-transitory machine-readable mediums of claim 18, wherein the one or more instructions cause the one or more processors further to:

partition the target database into a second plurality of partitions of rows of target data comprising at least a first target partition of target rows and a second target partition of target rows;

apply the at least one user-defined validation rule for a first comparison of the data within the first partition to the target data within the first target partition; and store a first validation status comprising a first result of the first comparison.

21. The one or more non-transitory machine-readable mediums of claim 20, wherein the plurality of partitions of rows of data further comprises a third partition of rows, wherein the second plurality of partitions of rows of target data further comprises a third target partition of target rows, and wherein the one or more instructions cause the one or more processors further to:

at a first time, determine that the third partition has no change data capture (cdc) events that have changed data within the third partition;

apply the at least one user-defined validation rule for a second comparison of data within the third partition to the target data within the third target partition of target rows;

check whether the data within the third partition has changed after applying the at least one user-defined validation rule, wherein the data of the third partition has changed as a result of the third partition having a cdc event between the first time and a second time; and store a third validation status of the third partition as not being validated, responsive to a determination that the data of the third partition has changed after the at least one user-defined validation rule is applied.

22. The one or more non-transitory machine-readable mediums of claim 20, wherein the one or more instructions cause the one or more processors further to:

store the first validation status of the first partition as matched or unmatched resulting from the applying the at least one user-defined validation rule responsive to a determination that the data within the first partition has no change data capture (cdc) events after the at least one user-defined validation rule is applied.

23. The one or more non-transitory machine-readable mediums of claim 20, wherein the one or more instructions cause the one or more processors further to:
- determine that the second partition has a second number of rows that are currently changing and that the second number is greater than the threshold value; and
- responsive to a determination that the second number of rows is greater than the threshold value,
  - split the second partition into a second plurality of sub-partitions comprising at least a third sub-partition of rows and a fourth sub-partition of rows;
  - split the second target partition into a second plurality of target sub-partitions comprising at least a first target sub-partition of target rows and a second target sub-partition of target rows;
  - apply the at least one user-defined validation rule for a third comparison of the third sub-partition to the first target sub-partition; and
  - store a validation status comprising a result of the third comparison.

\* \* \* \* \*